(12) United States Patent
Ding et al.

(10) Patent No.: US 12,535,174 B2
(45) Date of Patent: Jan. 27, 2026

(54) APPARATUS, SYSTEM AND METHOD FOR INSULATED CONDUCTING OF FLUIDS

(71) Applicant: PMC PUMPS INC., Calgary (CA)

(72) Inventors: Yuchang Ding, Calgary (CA); Rong Zheng, Calgary (CA)

(73) Assignee: PMC Pumps Inc., Calgary (CA)

( * ) Notice: Subject to any disclaimer, the term of this patent is extended or adjusted under 35 U.S.C. 154(b) by 0 days.

(21) Appl. No.: 18/606,950

(22) Filed: Mar. 15, 2024

(65) Prior Publication Data

US 2025/0290593 A1  Sep. 18, 2025

(51) Int. Cl.
*F16L 59/12* (2006.01)
*F16L 15/00* (2006.01)

(52) U.S. Cl.
CPC ............. *F16L 59/12* (2013.01); *F16L 15/006* (2013.01)

(58) Field of Classification Search
CPC ......... F16L 59/18; F16L 59/181; F16L 59/14; F16L 9/02
See application file for complete search history.

(56) References Cited

U.S. PATENT DOCUMENTS

| | | | | |
|---|---|---|---|---|
| 2,599,210 A | * | 6/1952 | Thompson | F16L 59/14 138/149 |
| 2,926,701 A | * | 3/1960 | Campbell | F16L 59/14 137/328 |
| 3,479,059 A | * | 11/1969 | Taylor | F16L 59/14 285/55 |
| 3,492,029 A | | 1/1970 | French et al. | |
| 3,563,572 A | | 2/1971 | French | |
| 3,578,360 A | * | 5/1971 | Eliot | F16L 59/14 285/55 |
| 3,854,756 A | | 12/1974 | Couch | |
| 4,025,091 A | | 5/1977 | Zeile, Jr. | |
| 4,332,401 A | * | 6/1982 | Stephenson | F16L 59/181 285/47 |
| 4,415,184 A | * | 11/1983 | Stephenson | F16L 59/14 285/47 |
| 4,459,731 A | | 7/1984 | Hutchison | |
| 4,635,967 A | * | 1/1987 | Stephenson | F16L 59/14 285/47 |

(Continued)

FOREIGN PATENT DOCUMENTS

| | | | |
|---|---|---|---|
| DE | 3318045 C1 | 12/1984 | |
| FR | 2873427 A1 * | 1/2006 | ............. F16L 59/14 |

(Continued)

OTHER PUBLICATIONS

International Search Report and Written Opinion for PCT/CA2024/050317 issued Dec. 13, 2024.

(Continued)

*Primary Examiner* — Matthew Troutman
*Assistant Examiner* — Fannie Kee
(74) *Attorney, Agent, or Firm* — Knobbe, Martens, Olson & Bear LLP

(57) ABSTRACT

The present disclosure relates to a thermally-insulated conduit (TIC) for use in conducting fluids from a first location to a second location. The TIC a metal conduit; and at least a first layer of a thermal-insulation material (TIM) that is operatively coupled to the metal conduit for preventing transfer of some, substantially, most or all thermal energy between inside the conduit and outside the conduit.

12 Claims, 29 Drawing Sheets

(56) References Cited

U.S. PATENT DOCUMENTS

| | | | | |
|---|---|---|---|---|
| 4,856,828 A * | 8/1989 | Kessler | ............... | F16L 59/14 |
| | | | | 285/55 |
| 5,470,111 A * | 11/1995 | Nelson | ............... | F16L 59/14 |
| | | | | 285/55 |
| 2011/0041934 A1 | 2/2011 | Holler | | |
| 2020/0049281 A1* | 2/2020 | Zuzelski | ............ | F16L 59/181 |
| 2024/0102601 A1* | 3/2024 | Ding | ................ | F16L 59/14 |

FOREIGN PATENT DOCUMENTS

| | | | | |
|---|---|---|---|---|
| GB | 1160639 | | 8/1969 | |
| RU | 22500 U1 | | 4/2002 | |
| RU | 2669218 C1 | * | 10/2018 | ............ F16L 59/14 |

OTHER PUBLICATIONS

International Search Report and Written Opinion for PCT/CA2024/051192 issued Dec. 31, 2024.
Office Action issued in CA 3254464 dated May 14, 2025.
International Search Report and Written Opinion for PCT/CA2025/050287 dated Jun. 16, 2025.
Sealing Solutions for Oil and Gas Applications—Parker Prädifa, Apr. 2020.
Office Action for CA 3254464 issued Dec. 1, 2025.

* cited by examiner

APPARATUS, SYSTEM AND METHOD FOR INSULATED CONDUCTING OF FLUIDS

TECHNICAL FIELD

This disclosure generally relates to conducting fluids. In particular, the disclosure relates to an apparatus, system and method for conducting fluids with thermally insulated conduits (TICs).

BACKGROUND

Conducting fluids through a thermally-insulated conduit (TIC) within an underground wellbore, pipeline or an above-ground pipe is becoming more demanding, while providing specific benefits. Non-limiting examples of wellbore processes that benefit from TICs include, but are not limited to: various oil-and-gas processes, such as cyclic steam stimulation, steam flooding, steam assisted gravity drainage; geothermal processes; under surface and above-surface transport of fluids and the like. The TICs may provide various benefits, such as increased energy efficiency, isolating hot fluids from cold fluids or operational components, insulating thermally-sensitive environments from cold or hot fluids, and insulating fluids from cold or hot environments.

Wellbores, conduit, pipelines and the processes operated therein present a number of challenges, such as high fluid pressures, high temperatures and corrosive chemicals, to name a few. As such, implementing a layer of thermal insulation about a wellbore conduit, which are typically made of steel that is conducting high pressure and high temperature fluids, is difficult. For example, the common approach for providing thermal insulation on above-ground conduits, such as external wraps of typical insulation materials, are too fragile and difficult to handle for use in a wellbore. Furthermore, the known external wraps of typical insulation materials are not suitable for use threaded connections within a confined wellbore, with threaded connections being the most common method of connecting conduits in a string of conduits and implementing them into a desired depth of a wellbore (often times hundreds to thousands of meters).

One known approach for providing a TICs within a wellbore is to deploy two, concentrically arranged steel tubes that are welded together, or otherwise closed, at both ends to create an internal annular space and then creating a vacuum within that internal annular space to make a vacuum-insulated conduit, also referred to as vacuum-insulated tubing (VIT). The vacuum-insulated conduit uses an inner steel tube through which a fluid is conducted and an outer steel tube. The tubes are made of steel (or other similar mechanical strength materials) so that the tubes can withstand the torque that is applied to threadably connect the tubes together to form a tubing string and so that the tubing string can withstand the linear force required to deploy the tubing string down into a desired depth of the wellbore, such as thousands of feet from surface. Vacuum-insulated conduits are used to provide thermally insulated flow-paths for conducting fluids through an oil-and-gas well or a geothermal well. The distances that such fluids are required to be conducted require typically hundreds of individual lengths of vacuum-insulated conduit to be connected, endwise to each other to form a string of conduits. Many known vacuum-insulated tubes have connectors, such as threaded connectors, at each end and there is no internal annular space or vacuum at the ends. Therefore, at least some portions of vacuum-insulated conduits are without the vacuum and about 90% thermal conduction (either heat loss or gain) can occur across the walls of the conduit at the connection points along a large portion of, or substantially along all of, the string of conduits. Additionally, if the vacuum within the internal annular space is lost, which occurs for various reasons, there may be an increase in thermal conductivity across the walls of the (non) vacuum-insulated section. Furthermore, the inner conduit and outer conduit are often made by welding and connecting the steel tubing suitable for the pressures, temperatures and chemicals of a wellbore environment. Vacuum-insulated conduits have to be manufactured within strict specifications and with significantly more materials per length, accordingly, vacuum-insulated conduits are much more expensive than a standard, non-insulated conduits. However, thermal expansion caused by proximity to high temperature fluids and/or exposure to a pressure differential (between the pressure within the inner conduit and the pressure exerted upon the outer conduit) may also distort the vacuum-insulated conduits, which may lead to further loss of vacuum within the annular space between the inner and outer conduit.

It is also known to deploy some form of insulation material, such as thick mineral wool blankets or fiberglass, by wrapping those materials around a metal conduit. But those applications are labor intensive when deployed on remote field sites, and the known materials are fragile and easily absorb water if exposed to the elements or if deployed on an underground system of conduit.

As such, it may be desirable to provide new approaches for TICs, systems and methods that address some of the shortcomings of known solutions for conducting fluids through conduits with thermal insulation.

SUMMARY

The embodiments of the present disclosure relate to a thermally-insulated conduit (TIC) for conducting fluids from a first location to a second location. The TIC may comprise a first length of a metal conduit that is operatively coupled to at least a first layer of thermal insulation material (TIM). In some embodiments of the present disclosure, the at least first layer of TIM may be positioned within the TIC. In some embodiments of the present disclosure the at least first layer of TIM may be positioned about the TIC. In some embodiments of the present disclosure, the at least first layer of TIM may be two layers of TIM, a first layer of TIM and a second layer of TIM. The first and second layers of TIM may be made of the same materials, or not. In some embodiments of the present disclosure, the TIC further comprises a third layer of TIM, which may be made of the same materials as the first layer of TIM, the second layer of TIM, both the first layer and second layer of TIM, or the third layer of TIM may be made of a different material.

The at least first layer of TIM is operatively coupled to the TIC so that fluids within the TIC are thermally isolated from the environment in which the TIC is positioned. For example, the first location may be positioned underground and multiple TICs may be endwise coupled to conduct fluids from the first location to a second location. As the fluids are conducted from the first location to the second location, within a string of endwise connected TIMs, the temperature of the fluids is maintained substantially the same or there is a predetermined amount of heat transfer that occurs—either heat transfer into the conducted fluids or out of the conducted fluids. Heat transfer into the conducted fluids may occur when the temperature of the environment about the string of TICs is higher than the conducted fluids. Heat transfer out of the conducted fluids may occur when the temperature of the conducted fluids is higher than the environment about the string of TICs.

In some embodiments of the present disclosure, the first location is underground and the second location is above ground. In some embodiments of the present disclosure, the first location and the second location are both underground. In some embodiments of the present disclosure, the first location and the second location are both above ground.

In some embodiments of the present disclosure, the TIC comprises a first layer of TIM that is operatively coupled to an inner surface of the TIC.

In some embodiments of the present disclosure, the TIC comprises a first layer of TIM and a second layer of TIM, both of which are operatively to an inner surface of a metal conduit.

In some embodiments of the present disclosure, the TIC comprises a first layer of TIM, a second layer of TIM and a third layer of TIM, where all three layers of TIM are operatively coupled to an outer surface of metal conduit.

In some embodiments of the present disclosure, the TIC comprises a first layer of TIM that is operatively coupled to an inner surface of a metal conduit.

In some embodiments of the present disclosure, the TIC comprises a first layer of TIM and a second layer of TIM, both of which are operatively coupled to an inner surface of a metal conduit.

In some embodiments of the present disclosure, the TIC comprises: an intermediate insulation conduit that is made of a first TIM; an outer insulation conduit that is spaced from the inner insulation tubing for defining an annular gap therebetween, wherein the outer layer is made of a second TIM; and a layer of a third TIM that is positioned within the annular gap between the intermediate insulation conduit and the outer insulation tubing, wherein the third TIM has greater insulation properties than the first and second thermal insulation material.

In some embodiments of the present disclosure, the TIC comprises an inner conduit with a treated external surface; a layer of a TIM that is positioned about a longitudinal axis of the inner conduit; and an outer insulation conduit that is adjacent the TIM, wherein the outer insulation conduit is made of a second TIM; wherein the TIM has greater insulation properties than the second thermal insulation material.

Some embodiments of the present disclosure relate to a method of making a TIC, the method comprises the steps of: receiving an inner layer of insulation pipe; securing a connector to one end of the inner layer of insulation pipe; positioning a second layer of a further insulation material about the inner layer; positioning an outer layer of insulation pipe about the further thermal insulation material; and, coupling, with a threaded plug and a connector, the inner layer, the further thermal insulation material and the outer layer together at one end to reinforce the thermally insulated conduit.

Some embodiments of the present disclosure relate to a method of making a thermally insulated conduit, the method comprises the steps of: receiving a metal conduit; positioning at least one layer of TIM about a longitudinal axis of the metal conduit, either to an inner or outer surface of the metal conduit; securing a connector to one end of the conduit for operatively coupling the at least one layer of TIM to the metal conduit. Optionally, a second layer of TIM may be positioned spaced apart from the first layer so as to define a gap therebetween. Optionally, the gap may be at least partially filled with a second TIM, an inert gas or a vacuum may be formed therein.

Some embodiments of the present disclosure relate to a method of deploying (which may also be referred to as installing) a string of TICs within a wellbore. The method comprises the steps of receiving a downhole tool connection assembly, wherein the connection assembly may be pre-installed with about or within a first-length metal conduit; connecting a second-length metal conduit to the first length metal conduit, wherein the second-length metal conduit is longer than the first-length metal conduit; positioning a TICs about or within the second-length metal conduit, along the longitudinal axis the second-length metal conduit, by sliding the TICs over the second-length metal conduit down to be positioned about the first-length metal conduit; securing the TICs in place to at least a portion of the first-length metal conduit and at least a portion of the second-length metal conduit; advancing the downhole tool connection assembly and the connected conduits into a well; and repeating the steps of connecting a full-length metal conduit to the upper end of an already deployed/installed metal conduit and position a next length of TICs over the connected but uncovered metal conduits and the steps of securing the TICs.

Some embodiments of the present disclosure relate to a method of deploying a string of TICs for conducting fluids within a well. The method comprises the steps of: securing a production conduit to a downhole assembly to provide fluid communication between an inner bore of the production conduit and the fluid outputs of the downhole tool; deploying a first TIC within the production conduit; coupling a second TIC conduit to the first TIC and rotating at least one of the first TIC or the second TIC to threadably engage the two conduits together. Optionally, the method may further include a step of establishing a vacuum or injecting inert gas within the each length of TICs after the step of connecting and securing and prior to advancing the string of conduits into the well.

Some embodiments of the present disclosure relate to a TIC comprising: a metal conduit with a treated external surface; a layer of a TIM that is positioned about a longitudinal axis of the inner conduit; and an outer insulation conduit that is adjacent the thermal insulation material, wherein the outer insulation conduit is made of a second thermal insulation material; wherein the thermal insulation material has greater insulation properties than the second thermal insulation material.

In some embodiments of the present disclosure, the TIC may further comprise a conduit connector positioned at one end thereof for operatively coupling the at least one layer of TIM to the metal conduit. In some embodiments of the present disclosure, a conduit connector is positioned at both ends of the TICs. In some embodiments of the present disclosure, the conduit connector comprises: a first connector for connecting one layer of TIM to the conduit connector; a second connector for connecting another layer of TIM to the conduit connector; one or more screws for externally connecting the one layer of TIM and the other layer of TIM to the conduit connector. In some embodiments of the present disclosure, the conduit connectors may be an O-ring.

Some embodiments of the present disclosure further comprise one or more strip clips positioned about an external surface of an outer layer of TIM or the conduit connector for further securing the operative coupling of the conduit connector, the at least one layer of TIM and the metal conduit together.

Without being bound by any particular theory, the further thermal insulation material within the TICs may have the ability to expand about 70% to about 600% of its unexpanded dimensions and, therefore, the TICs can withstand any thermal expansion and thermal contraction of the metal conduit. The stress caused by thermal expansion of the metal conduit could be a percentage of that observed in conventional vacuum-insulated conduit. Furthermore, with specific welding or double threaded metal pipes the wall thickness of both thermal insulation conduit and the metal conduit can be reduced from the wall thickness of conventional double metal wall vacuum insulation conduit, therefore, saving space in the wellbore.

Some embodiments of the present disclosure relate to a method of deploying a string of TICs within a wellbore. The method comprises the steps of: securing a production conduit to a downhole assembly for establishing fluid communication between an inner bore of the production conduit and the fluid outputs of the downhole tool; deploying a string of intermediate TICs—that includes an internal or external string of metal conduits—within the production conduit and operatively coupling the string of TICs with an exhaust fluid output of the downhole tool. The method further comprises a step of deploying a string of TICs—that also include an internal or external string of metal conduits—within the string of intermediate TICs and operatively coupling the internal string of TICs with a power fluid intake of the downhole pump. As will be appreciated by those skilled in the art, the intermediate string of conduits may be operatively coupled to the power intake of the downhole pump and the internal string of TICs may be operatively coupled to the exhaust fluid output of the downhole tool.

In some embodiments of the present disclosure, the full-length thermally insulated conduit to threadably engage the two conduits together; advancing thermally-insulated layers of the thermally insulated conduit downhole to cover the first inner conduit; rotating one after another the intermediate conduits including both the metal conduit and the insulation conduit; coupling a second full-length thermally insulated conduit to the first intermediate conduit by an internal retainer mechanism; connecting the thermally-insulated layers to the first inner conduit by the conduit connector; applying external connectors at the location of the conduit connector; and pushing the string of threadably engaged conduits downhole with the internal retaining mechanism.

Some embodiments of the present disclosure may also be preassembled by operatively coupling the at least first layer of TIM with a given length of metal conduit. This preassembly would save deployment time at remote sites and allow stronger and more durable TIMS to be deployed.

Without being bound by any particular theory, the embodiments of the present disclosure may address some of the known shortcomings of known vacuum-insulated conduits or tubulars, VIC (vacuum insulated conduit) or VIT (vacuum insulated tubular). The weld seams at both ends of every VIC or VIT joint within each coupler are an essential feature of VITs that integrate an outer tubing and an inner tubing together and form the vacuum therebetween by welding seams at both ends of the two tubulars. At same time, the weld seams can degrade causing the VIT nominal insulation K-value of around 0.01 along the length of the VIT to decrease by 10 times or more. The welded seams can be one to two inches wide and because they are seams of steel, heat can conduct therethrough with a k-value of about 45, or 4500 times bigger than VIT body's nominal insulation heat conduct k-value 0.01 around. The embodiments of the present disclosure reduce undesired thermal energy transmission (conduction) by eliminating the direct contact of or completely separating any thermally conductive materials (outer steel tubing and inner steel tubing) with TIMs, including over any connection portions. TIMs within the internal annular gap and TIMs inside a coupler provide thermal insulation properties, among which TIMs within the internal annular gap will provide insulation K-value close to those found along the VIT body. Without being bound by any particular theory, the embodiments of the present disclosure may have 10 times higher thermal insulation properties than known VITs. Furthermore, the embodiments of the present disclosure may provide the enhanced thermal insulation properties at a much lower cost with much easier manufacturing requirements, as compared to known VICs and VITs, which are manufactured with the strictest welding and quality control requirements.

Without being bound by any particular theory, the embodiments of the present disclosure address another major shortcoming and may provide a substantially much more durability in thermal insulation properties over the known dominate downhole tubular approaches, Vacuum Insulation Tubular, or VIT. For example, VIT as a thermal insulation tubular demands inner tubing and outer tubing exposed to different temperature environment, so resulted in different thermal expansion. But each VIT joint's fixed weld seams prohibit that thermal expansion difference, therefore always react a huge thermal stress back on to the weld seams, weaken the weld seam, cause weld seam crack under high wellbore pressure, deplete the vacuum, so cause VIT insulation loss and early failure. The embodiments of the present disclosures have many different design variations, but all designs have same feature that inner tubing can slide with outer tubing when the insulation make temperature different or the thermal expansion change. That means the temperature change from insulation would not cause any thermal stress or any distortion on to the disclosed insulation tubulars. The high temperature seals will still function properly and prevent the environmental fluid invading into the TIM chamber and protect the TIM maintaining its insulation properties. So the disclosed insulation tubular will make insulation last much longer than VIT to transmit much higher differential temperature fluid within the deep and high-temperature wellbore.

Some embodiments of the present disclosure relate to a TIC that comprises: an outer conduit that defines a first end, a second end and a central bore that extends therebetween; a first support that is operatively connected proximal the first end of the outer conduit, the first support extends inwardly through the central bore away from the outer conduit; a first spacer that is supported by the first support, wherein the first spacer is made of a material that has desired rigid properties and desired thermal insulator properties; an end cap that is positionable within the central bore, the end cap defining an shoulder that extends through the central bore towards the outer conduit. The first spacer is positionable between the first support and the shoulder of the end cap, and the TIC defines a gap between the first support and the end cap.

Without being bound by any particular theory, the desired rigid properties that the first spacer is made of allows the first spacer to at least partially bear the weight of the tubulars connected below the TIC within the temperature and pressure environment of a well. Furthermore and without being bound by any particular theory, the materials that the first spacer is made of also provides thermal insulator properties so as to reduce, prevent or substantially stop a transfer of thermal energy (i.e. heat) through the first spacer.

Without being bound by any particular theory, the gap between the first support and the end cap may reduce or substantially stop any transfer of thermal energy between the first support and the end cap.

In some embodiments of the present disclosure the TIC also comprises a further spacer that is positionable proximal the second end of the outer conduit within the central bore, the further spacer is at least partially supported by a support ring that engages the outer conduit.

In some embodiments of the present disclosure the TIC also comprises a first layer of a thermally insulating material (TIM) that is positionable within the central bore adjacent an inner surface of the outer conduit, the layer of TIM is at least partially supported by the end cap and the first support at a first end of the layer of TIM and by the further spacer at a second end of the layer of TIM.

In some embodiments of the present disclosure the TIC also comprises a coupler that is configured to operatively couple to the first end of the outer conduit and to a second end of a second TIC.

In some embodiments of the present disclosure the TIC the end cap is positionable to abut between an inner surface of the first end of the outer metal conduit and an outer surface of the first end of the inner conduit, the first end cap is configured to provide a fluid tight seal between the inner surface of the end cap and the outer surface of the inner conduit at the respective first ends, second ends.

In some embodiments of the present disclosure the TIC also comprises a sealing member that is positionable within the central bore, within the coupler, adjacent an outer surface of the end cap and at least partially supported by the shoulder of the end cap.

In some embodiments of the present disclosure the TIC the sealing member is made of a TIM.

In some embodiments of the present disclosure the TIC also comprises the first spacer is made at least partially of a TIM (or the first thermal insulated end cap in some case), the first layer of TIM, the second spacer is made at least partially of a TIM (or the second thermal insulated end cap in some case), and the third spacer is made at least partially of a TIM (or the compressed sealing member). Together, these three uses of TIMs, which may be the same or different TIMs, may provide complete coverage of the whole length of the central bore so that there are few or no portions of the central bore where thermal energy (i.e. heat) can transmit to or from the central bore, across the conduit or conduits of the TIC.

In some embodiments of the present disclosure the TIC also comprises an inner conduit that is positionable within the central bore, coaxial with the outer conduit and spaced therefrom, wherein the inner conduit is configured to be operatively coupled to an inner surface of the end cap.

In some embodiments of the present disclosure the TIC the end cap is threadably connectible with a first end of inner conduit and the end cap is configured to be in a slidable and overlapping arrangement with a second end of the inner conduit from a second TIC.

In some embodiments of the present disclosure the TIC also comprises a second end of an inner conduit from the second TIC is thermally expandable into the end cap and the TIC inner conduit length is also thermally expandable if a temperature within the central conduit is greater than a temperature outside the outer metal conduit.

In some embodiments of the present disclosure the TIC also comprises a support ring that is positioned between the outer conduit and an outer surface of the inner conduit.

Some embodiments of the present disclosure relate to an assembly of two thermally insulated conduits (TICs) that are operatively connected endwise to each other, for example by a threaded connection. The assembly comprises a first TIC and a second TIC. In some embodiments of the present disclosure, the first TIC comprises: an outer conduit that defines a first end, a second end and a central bore that extends therebetween; a first support that is operatively connected proximal the first end of the outer conduit, the first support extends inwardly through the central bore from the outer conduit; a first spacer that is supported by the first support, wherein the first spacer is made of a material that has desired rigid properties and desired thermal insulator properties; an end cap that is positionable within the central bore, the end cap defining an shoulder that extends towards the outer conduit, and the first spacer is positionable between the first support and the shoulder of the end cap. Furthermore, the first TIC defines a gap between the first support and the end cap. The second TIC that is operatively coupled to the first end of the first TIC. The second TIC comprises a spacer that is positionable proximal the second end of the outer conduit within the central bore, the further spacer is at least partially supported by a support ring that engages the outer conduit, and a coupler that is operatively connects the first end of the first TIC to the second end of the second TIC extending the central bore of the first TIC through the second TIC to form a substantially complete seal to prevent fluid communication from the central bore across the coupler, the first TIC and the second TIC. The assembly is configured to prevent some or substantially all movement of thermal energy (i.e. heat) from the central bore to across the coupler, the first TIC and the second TIC and vice versa.

BRIEF DESCRIPTION OF THE DRAWINGS

These and other features of the present disclosure will become more apparent in the following detailed description in which reference is made to the appended drawings.

DETAILED DESCRIPTION

The embodiments of the present disclosure relate to a TICs, a system that uses the TICs, methods of making TICs and methods of installing such systems.

Embodiments of the present disclosure will now be described by reference to FIG. 1 to FIG. 29, which show representations of the TICs, systems and methods according to the present disclosure.

Figure 1:
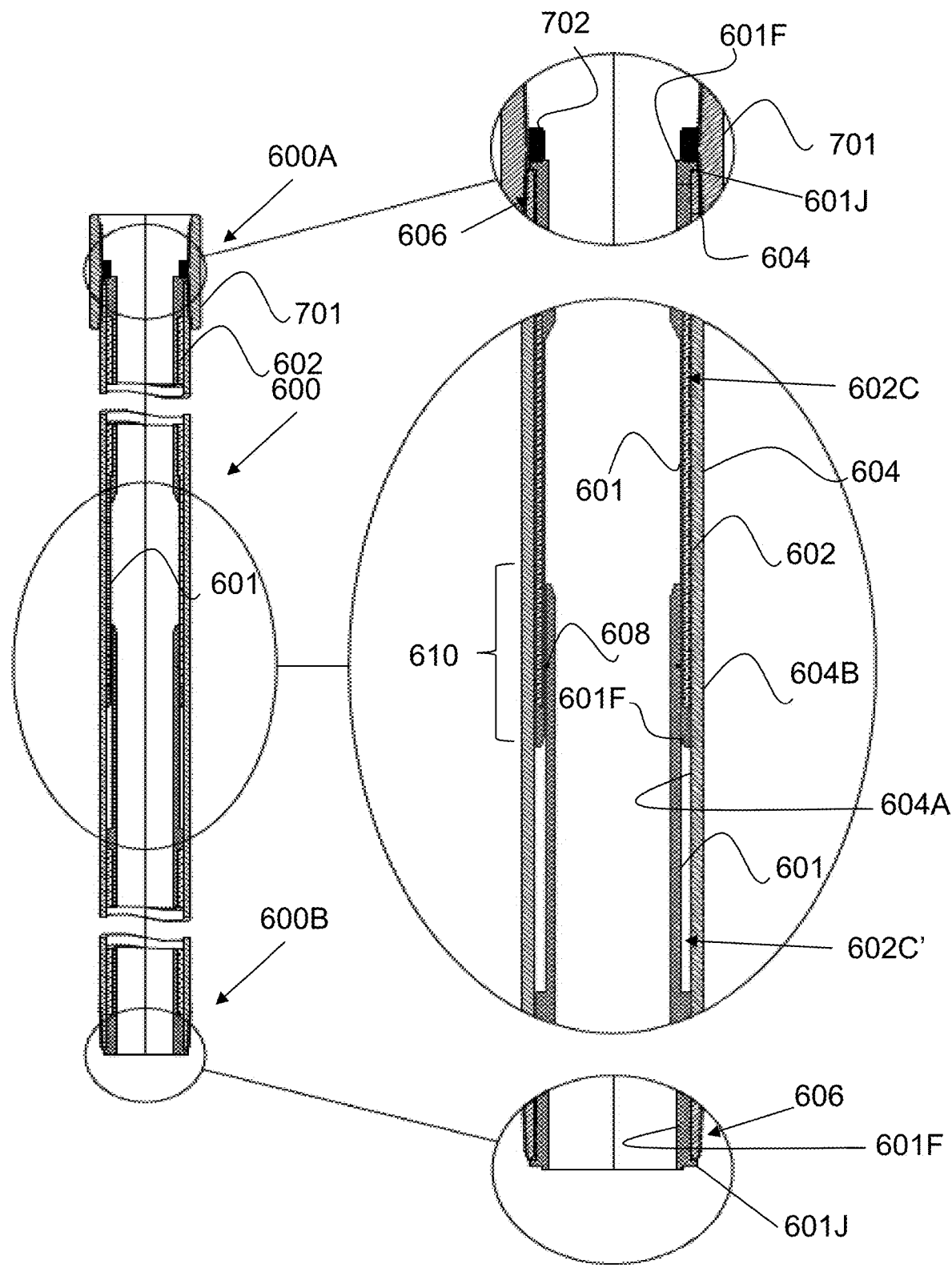
FIG. 1 is a side-elevation, mid-line cross-sectional view of a thermally insulated conduit (TIC) with an external metal conduit, according to embodiments of the present disclosure, wherein FIG. 1 includes three zoomed-in sections to show greater detail.

FIG. 1 shows one example of a thermally-insulated conduit (TIC) 600 that can be used in a system that uses multiple TICs that are endwise connected to form an internal flow path for conducting fluids between a first location and a second location. In some embodiments of the present disclosure, the first location may be below a surface of the ground, also referred to herein as underground, and the second surface may be above ground. In some embodiments of the present disclosure, the first location may be above ground and the second location may be underground. In some embodiments of the present disclosure, the first location and the second location may both be underground. In some embodiments of the present disclosure, the first location and the second location may both be above ground, with some or none of the internal fluid path being below ground.

FIG. 1 shows one embodiment of a thermally-insulated conduit (TIC) 600 that comprises at least one layer of a thermal-insulation material (TIM) 601 and a metal conduit 604. As shown in the upper, zoomed-in oval section of FIG. 1, the TIC 600 comprises a first end 600A and an opposite, second end 600B. Each of the ends 600A, 600B are connectible to another TIC 600 by a conduit connector 701, described further herein below. Briefly, the TIC of the present disclosure may be deployed as strings of endwise connected TICs with an internal fluid flow path defined therein. The length of endwise-connected TICs may be nested within one or more other conduits, for example other TICs, creating multiple fluid flow paths. In these embodiments, a fluid may flow through a first internal fluid path of a string of conduits in one direction and another fluid may flow in an opposite direction through a second internal fluid path of another string of conduits. As used herein, the phrase "length of endwise connected conduits" may be used interchangeably with "conduit string", "tubing string", "string of conduits" and the like, as the context will dictate. Similarly, the terms "conduit", "pipe" and "tube" may be used interchangeably.

As shown in the middle, zoomed-in oval section of FIG. 1, the TIC 600 may comprise a metal conduit 604 and a first layer 601 that is operatively coupled to the metal conduit 604. The first layer of one or more thermal-insulation materials (TIM) 601 is positioned adjacent to and is operatively coupled to an inner surface 604A of the metal conduit 604. The first layer of TIM 601 is configured to prevent transfer of some, substantially most or all thermal energy between inside the first layer of TIMs and outside the first layer of TIM 601. For clarity, the expression transfer of some, substantially most or all thermal energy between inside the TIM and outside the TIM, or vice versa, may also be used interchangeably with transmission of some, substantially most or all thermal energy between inside the TIC and outside the TIC, or vice versa. Examples of suitable TIMs for the first layer 601 include mechanically strong, rigid and durable at high temperatures (for example at temperatures between about 25° C. and about 110° C., the suitable TIMS for the first layer 601 will maintain a desired shape and desired dimensions) includes, but are not limited to: polytetrafluoroethylene (PTFE), calcium silicate, fiberglass, formed and cured polymer/plastic or any combination thereof. Suitable TIMs for the first layer 601 will maintain a desired shape and desired dimensions with a structural integrity that is suitable for use in the desired environment such as an oil and/or gas well or a geothermal well. In the embodiments of the present disclosure, the TIMs that the first layer 601 is made of have one or more of the following properties: a moderate temperature rating, inert and easily manipulated into desired shapes and dimensions. For clarity, the operative coupling of the first layer of TIM 601 to the metal conduit 604 contemplates any manufacturing process whereby the first layer of TIM 601 is positioned upon, adjacent to or proximal to the inner surface 604A so that the first layer TIM 601 will remain in the intended position while being exposed to the fluid temperature, pressure and flow rates contemplated by this disclosure. For example, the first layer of TIM 601 may be pre-formed or machines into a conduit-shape of a precise dimension that forms a tight fit with the inner surface 604A. Such assembly can be further compressed and secured by sealing members 702 and the shoulder 601F when the metal conduit 604 is threadably connected with the conduit connector 701.

As shown in FIG. 1, the metal conduit 604 may be assembled with two sections of the first layer of internal TIM 601. Each TIM 601 will be inserted and assembled within the metal conduit 604 bore until a flanged end 601J of the TIM 601 abuts against an end of the metal conduit 604 defined by the threaded connection 606. When fully assembled, two pieces of the first layer internal insulation TIMs will meet, and overlap in a slidable relationship to each other at or near a longitudinal mid-point of the metal conduit 604. The middle portions of overlap 610 between the two sections of the first layer of insulation TIM 601 are not able to slide to their respective ends but have sufficient room for each section of TIM to experience greater thermal expansion than the metal conduit 604 does when the TIC is exposed to increased temperatures. This overlapping assembly 610 of two sections of TIMs insulation tubes inside the steel conduit 604 facilitates how a TIC that is comprised of different materials (i.e. the TIM and the metal conduit) with different thermal expansion properties can be assembled together.

Figure 2:
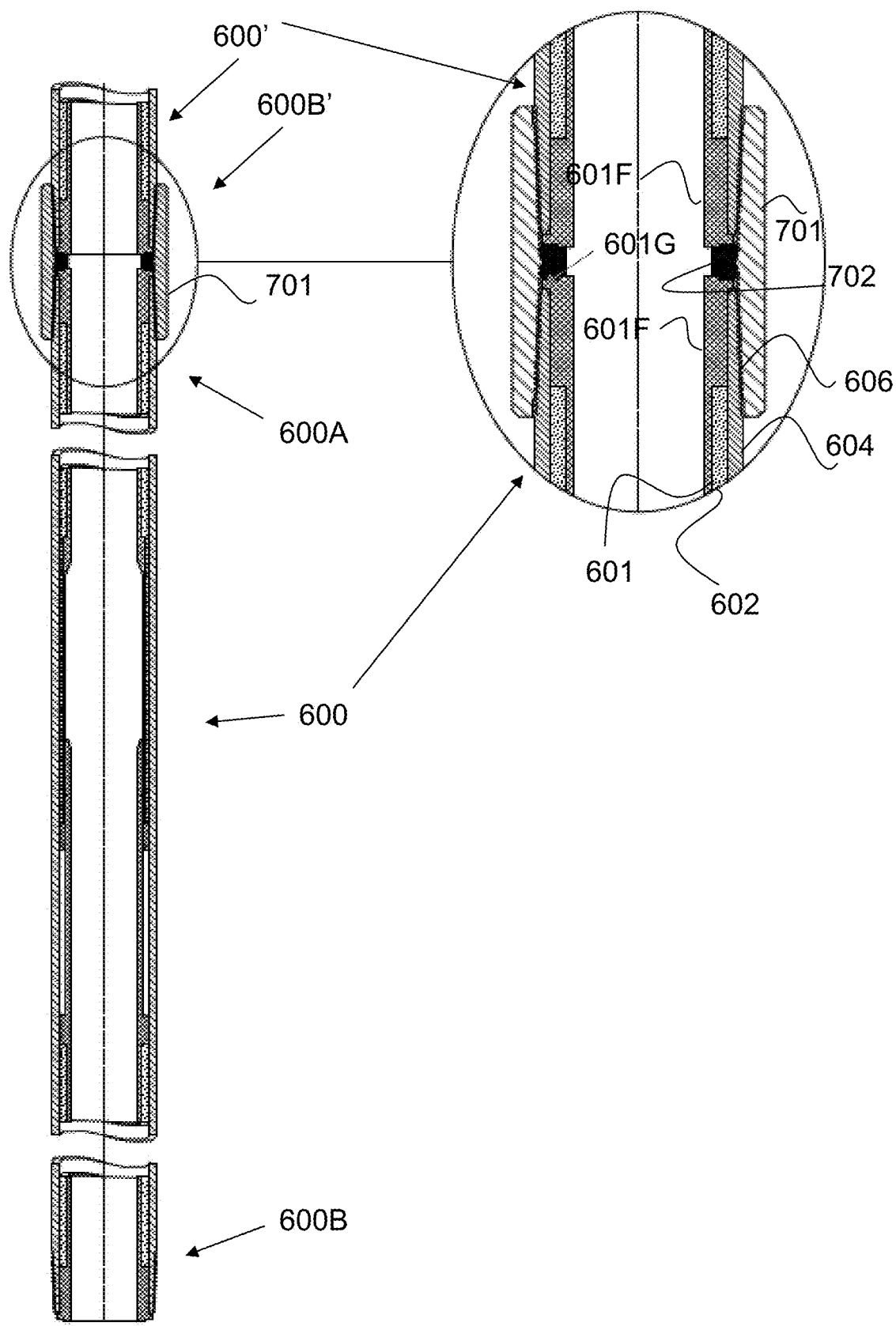
FIG. 2 is a side-elevation, mid-line cross-sectional view of the TIC of FIG. 1 shown in use and connected with a further TIC, wherein FIG. 2 includes a zoomed-in section to show greater detail.

As shown in the upper oval zoomed in sections of FIG. 2, When the two TICs 600 and 600A are each threadably connected with a conduit connector 701, both TIMs' flange shoulders 601F are driven by each threaded connection 606 accordingly to compress, squeeze and/or secure against the sealing element 702 inside the connector 701. This establishes a fluid-tight seal that prevents fluid from being communicated inside either TIC 600, 600A and entering the gap 602C. One or multiple sealing elements 608, such as O-ring seals, can be positioned within the overlap assembly 610 to prevent the fluid communication between inside the internal fluid path defined by the TIC 600 and the gap 602C preventing fluid incursion at the overlap assembly 610. The various sealing elements within the TIC 600, such as those positioned at both ends of the metal conduit 604 and the sealing elements 608 positioned proximal the mid-point of the TIC 600 may ensure that the gap 602C between steel conduit 604 and the first layer 601 remains dry.

In some embodiments of the present disclosure, such as the non-limiting example depicted in FIG. 1, the first layer 601 may be spaced from the outer metal conduit 604 so as to define a gap 602C therebetween. In some embodiments of the present disclosure, the gap 602C may be defined and sealed fluid tight by the shoulder 601F and the sealing element 702 that are defined at one end of the first layer 601 to facilitate and/or support the gap 602C. On two sections of the first layer 601, the shoulder 601F and the flange 601J may be defined as a thicker section of TIM at one or both ends of the first layer 601. The shoulder 601F may also be configured to operatively couple the first layer 601 to the metal conduit 604, as described herein.

In some embodiments of the present disclosure, the gap 602C may be at least partially filled, substantially filled or completely filled by a further or second layer of TIM 602 for preventing transfer of some, substantially most or all thermal energy across the gap 602C. Because the assembly of the TIC 600 defines a fluid tight gap 602C—by the metal conduit 604, the first layer of TIM 601, the sealing element 702, positioned at the flanged end 601J and the sealing elements seals 608 within the overlap assembly, the further second layer of TIM 602 may be made of material that is more fragile than the first layer 601 but with superior thermal insulation properties. For example, the second layer of TIM 602 may made of materials that include but are not limited to: an aerogel, cotton wool, cotton wool insulation, felt insulation, sheep wool, silica gel, Styrofoam, urethane foam, wool felt or any combination thereof. The further TIM 602 may be wrapped with aluminum foil or gridding cloth, injected, blown or otherwise positioned within the gap 602C. In some embodiments of the present disclosure, the further TIM 602 may be a different material than the TIMs that the first layer 601 is made of, or not. In some embodiments of the present disclosure, the further TIM 602 has a higher thermal insulation rating than the first layer 601. In some embodiments of the present disclosure, the further thermal TIM 602 is at least twice, five times or ten times better at preventing conduction of thermal energy therethrough as compared to the materials of the first layer 601.

As shown in the upper and lower, oval zoomed in sections of FIG. 1, at the first end 600A and the second end 600B, the metal conduit 604 may define a first part of a threaded connection 606 that is configured to releasably and threadably connect to the connection 701.

As shown in FIG. 1, the TIC 600 may also comprise more than one section of the layer 601 such that there is the overlap assembly 610 where there are two sections of the first layer 601 overlapping each other with at least one sealing member 608, such as an O-ring, positioned therebetween to prevent fluid communication between the two layers of the first layer 601. As shown in the non-limiting example of FIG. 1, a first portion of the gap 602C may have the second layer of TIM 602 positioned therein and a second, smaller portion of the gap 602C' may not so as to provide a volume of space into which the TIMs of the TIC 600 can thermally expand. The volume of space provided by the gap 602C' facilitates the greater thermal expansion and/or further thermal contraction of the first layer TIM 601 and the second layer 601 than of the metal conduit 601. For example, the overlap region 610 and the second portion of the gap 602C' can accommodate further thermal expansion of the TIM 601 than of the metal conduit 604, which can occur when the TIC 600 is in an environment that causes thermal expansion and/or when the TIC 600 is used to conduct fluids that are of a temperature that causes thermal expansion of the TIC 600.

In some embodiments of the present disclosure, the sealing element 702 may be a donut packing within the conduit connector 701 that is assembled with the sealing element 608 within in the overlap 610 area. The sealing element 702 may be packed off and compressed—for example when two TICs are threadably engaged with the conduit connection 701—to make a fluid tight seal at both the first and second ends of the first layer 601, which may be driven by the flange end 601J at both ends between the two metal conduits 604 as they are threadably connected to the connector 701.

The multiple O-rings could be arranged in the overlap 610 area to achieve more reliable seals.

Figure 3:
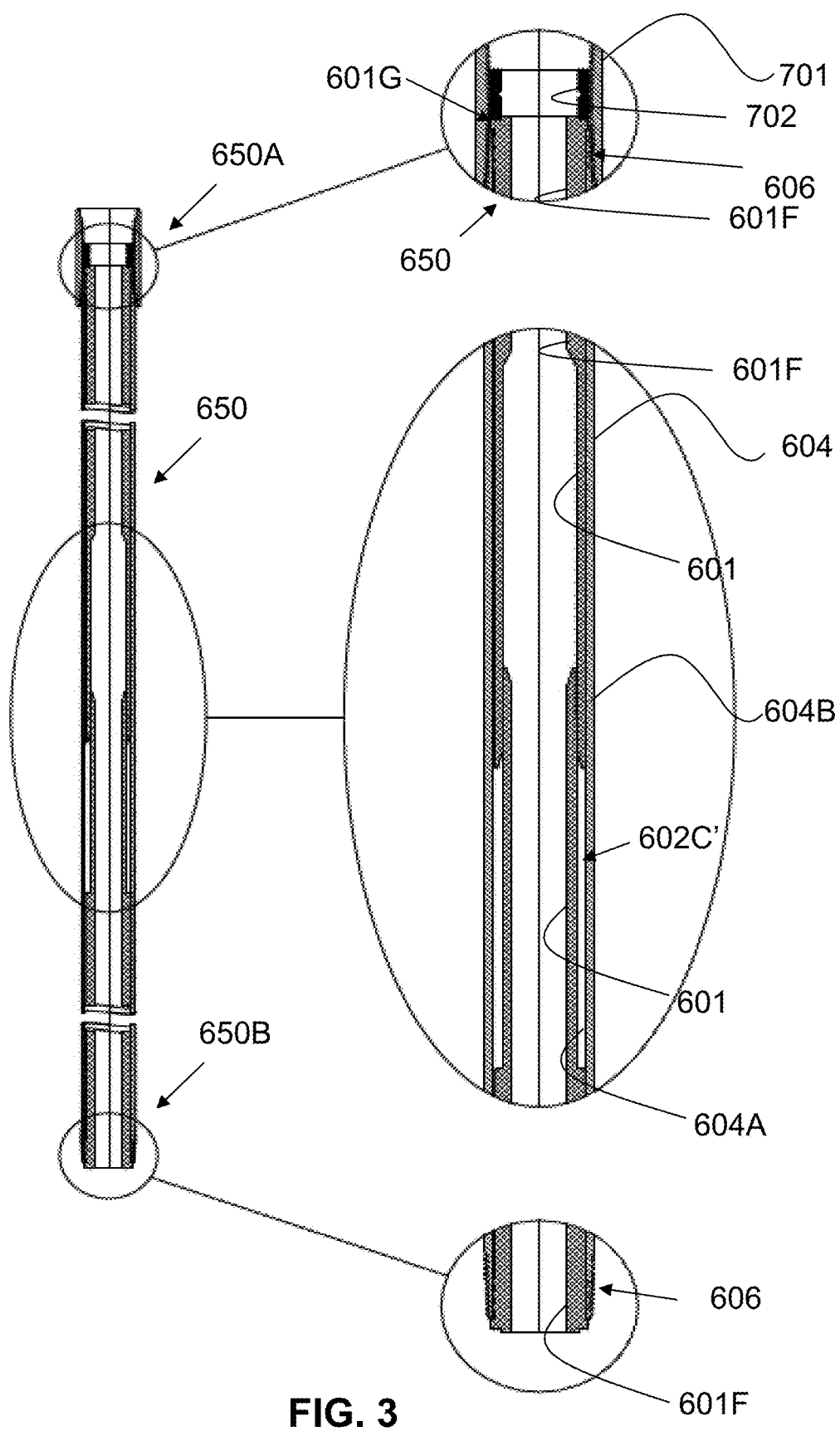
FIG. 3 is a side-elevation, mid-line cross-sectional view of a TIC with an external metal conduit, according to embodiments of the present disclosure, wherein FIG. 3 includes three zoomed-in sections to show greater detail.
Figure 4:
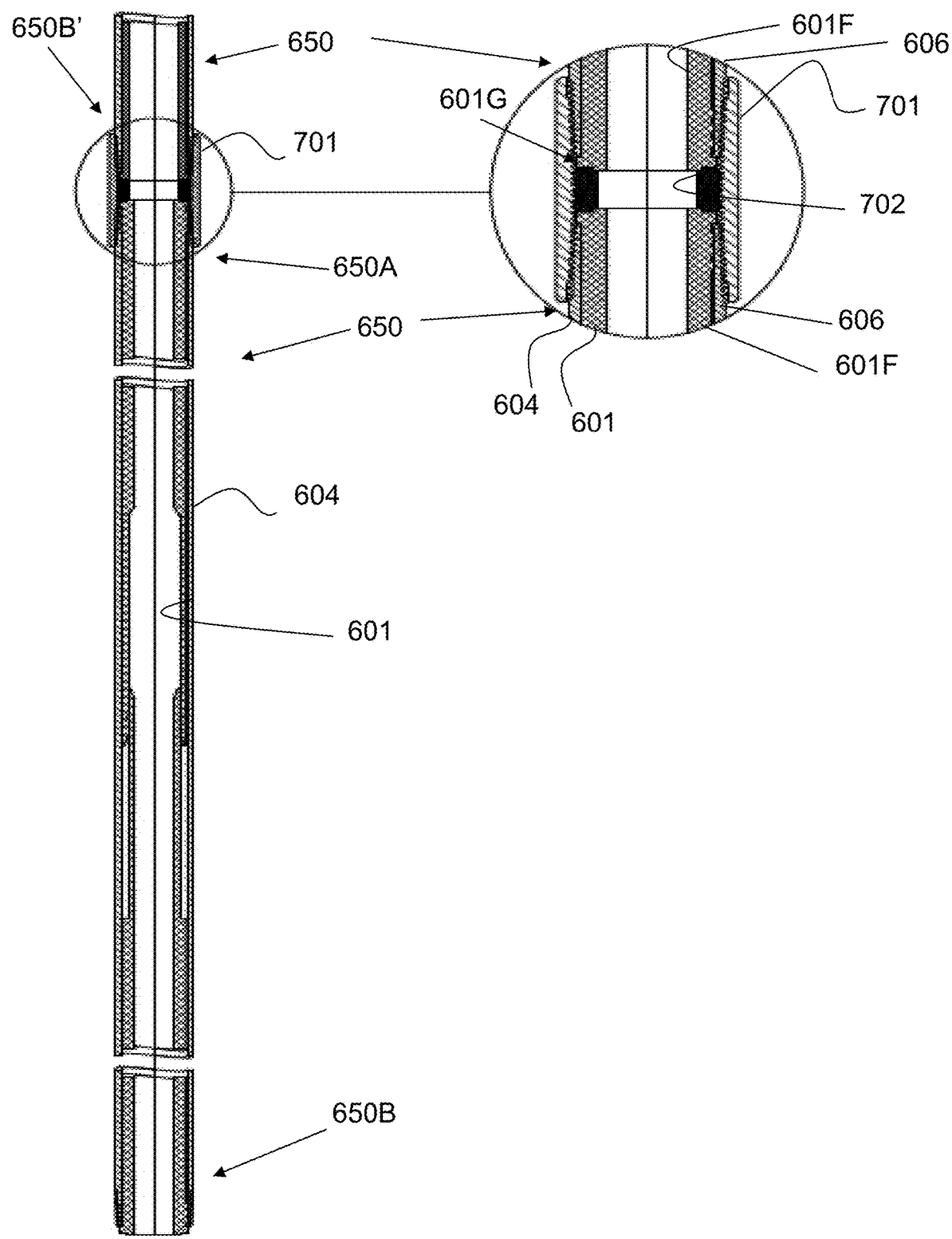
FIG. 4 is a side-elevation, mid-line cross-sectional view of the TIC of FIG. 3 shown in use and connected with a further TIC, wherein FIG. 4 includes a zoomed-in section to show greater detail.

FIG. 2 shows the TIC 600 of FIG. 1 with a zoomed-in oval section connected to another TIC 600', in particular the first end 600A of the conduit 600 and the opposite end 600B' of the conduit 600'. The other TIC 600' may be the same or substantially similar to the TIC 600. Each conduit 600, 600' has the metal conduit 604 with a first part of a threaded connection 606 defined about a respective end. In the case of the conduit 600, the first part of the threaded connection 606 is defined about the first end 600A, while the first part of the threaded connection 606 is shown defined about the second end 600B of the conduit 600'. Each of the first part of the threaded connection 606 are configured to releasably couple to a second part of the threaded connection of the connector 701, for example by threaded coupling. The threaded connector 701 may further comprise one or more sealing elements 702 to provide a fluid-tight seal to prevent any fluid communication between the internal flow path of the TIC 600, the connector 701 and the gap between the metal conduit 604 and the first inner layer TIM 601. The person skilled in the art will appreciate that various known sealing elements 702 are suitable for providing this fluid-tight seal. As shown in the upper oval section of FIG. 2, the shoulder 601F may further define a tab 601G, which extends externally to the first layer 601. When assembled, the first layer 601 may be fit in to the bore of metal conduit 604 and secured by its shoulder 601F and the compressed sealing element 702 inside the connector 701 when the connector 701 being threadably connected to the threaded connection 606 of the metal conduit 604. FIG. 3 shows another embodiment of a TIC 650 that comprises at least one layer of the TIM 601 and the metal conduit 604. As shown in the upper, zoomed-in oval section of FIG. 3, the TIC 650 comprises a first end 650A and an opposite, second end 650B. As shown in FIG. 4, each of the ends 650A, 650B are connectible to a second end 650B' of another TIC 650' by the conduit connector 701, as described regarding the endwise connectivity of the TIC 600 herein above. FIG. 4 also provides a non-limiting example of how the first layer 601 is operatively coupled to the metal conduit 601 via the assembly of the connector 701, the at least one sealing element 702 and the tab 601G.

TIC 600 and TIC 650 have many of the same structural features, with one difference being that the TIC 650 does not define the gap 602C shown in FIG. 1 and, therefore, TIC 650 does not include the further TIM 602. As such, TIC 600 may have superior thermal insulation properties, as compared to TIC 650.

Figure 5:
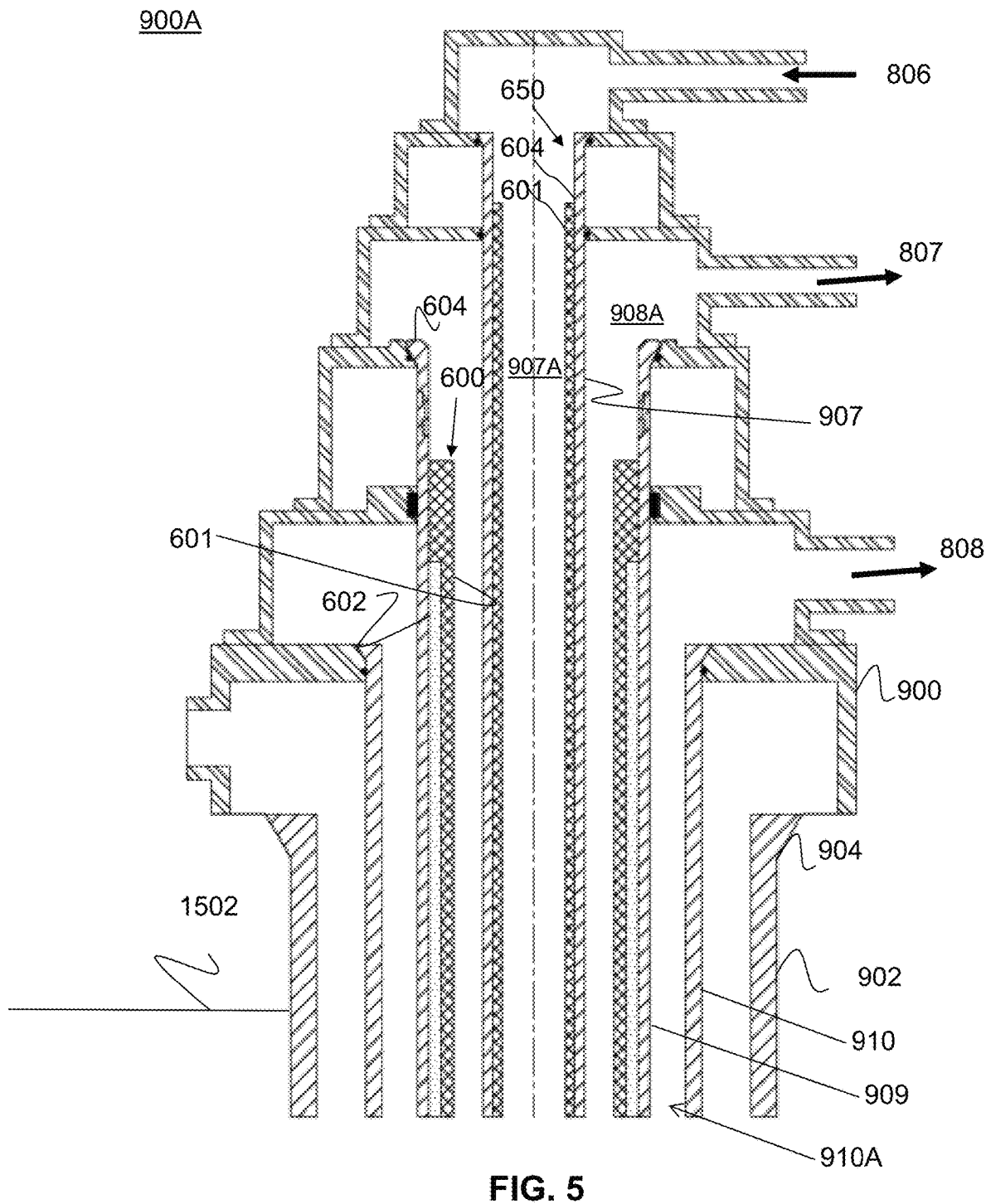
FIG. 5 is a side-elevation, mid-line cross-sectional view of a TIC that is operatively coupled with a wellhead, according to some embodiments of the present disclosure.

FIG. 5 shows a wellhead 900 that supports a casing string 902 by a casing hanger 904. The casing string 902 may extend from the wellhead 900 at the surface 1502 at least partially down into the well below. In the embodiment shown in FIG. 5, a central TIC 907 may be nested within an intermediate TIC 909. The central TIC 907 may define a bore 907A that receives a power hydraulic fluid 806 to communicate with the bore 202B in the first section 1100 via the inner conduit 201. The intermediate TIC 909 may be spaced from the central TIC 907 to define an annular space 908A therebetween. The annular space 908A is fluidly connected with a hydraulic exhaust output conduit of the downhole tool 805. In this arrangement, the power hydraulic fluid 806 is delivered downhole to the downhole tool 805 via the bore 907A and the exhaust hydraulic fluid 807 returns uphole to the surface 1502 via the annular space 908A. The power hydraulic fluid has a desired temperature of between about 45° C. to about 65° C. in order to allow the downhole tool 805, for example a hydraulically powered downhole pump, to operate properly. In some embodiments of the present disclosure, the power hydraulic fluid has a temperature of about 50 to about 55° C. After performing work within the downhole tool 805, the power hydraulic fluid 806 is converted to exhaust hydraulic fluid 807 has a temperature of between about 65° C. to about 85° C., which in some embodiments is about 65 to about 75° C. Due to the temperature difference between the power fluid and the exhaust fluid, the central TIC 907 may only have an inner layer TIMs positioned within the metal conduit. However, the intermediate TIC 908 may be of the type described herein, for example the TIC 600 or the TIC 650 because the intermediate conduit 908 is nested within a production string 910 with an outer annular space 910A defined therebetween. Produced fluids may be delivered to the surface 1502 via the outer annular space 910A from the first section 1100 by the work performed by the downhole tool 805, powered by the power hydraulic fluid 806. The produced fluids are much hotter than the exhaust hydraulic fluid with temperatures of between about 200° C. and 240° C. or hotter. In other embodiments of the present disclosure, the produced fluids may be a mixed phase of petroleum fluids and produced water, in other embodiments of the present disclosure, the produced fluids may be hot geothermal fluids.

Figure 6:
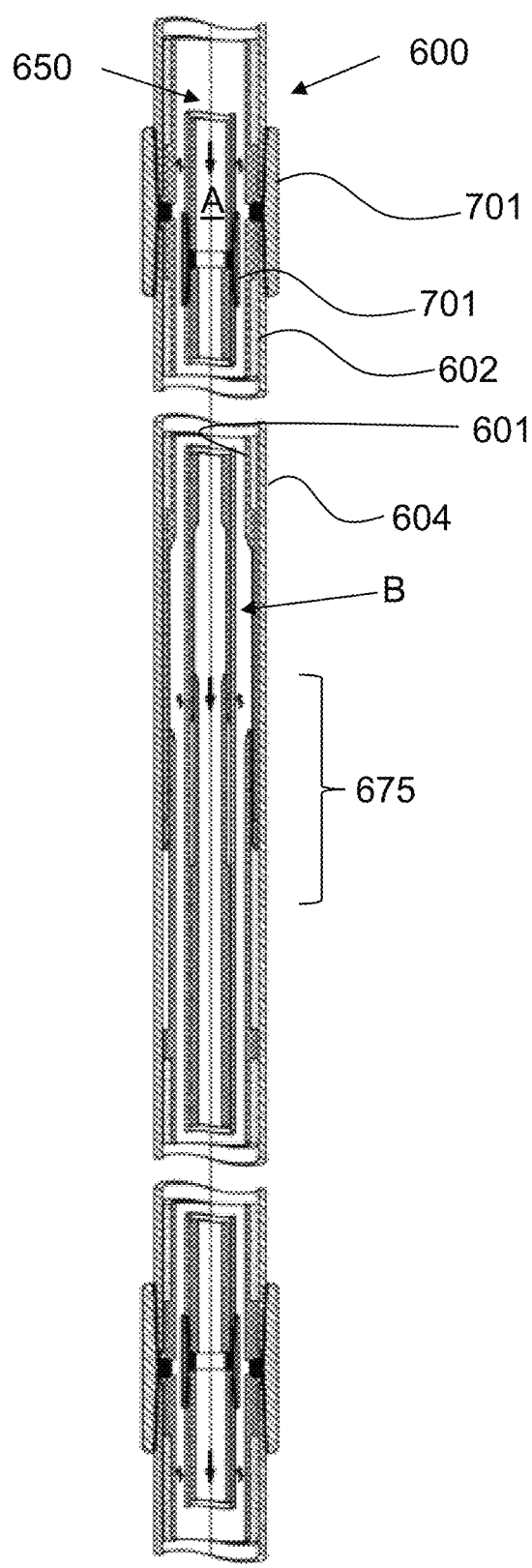
FIG. 6 is a side-elevation, mid-line cross-sectional view of a first TIC that is nested within a second TIC, according to some embodiments of the present disclosure.

FIG. 6 shows a further section of the string of multiple TICs, with the central TIC being a TIC 650 and the intermediate TIC being a TIC 600, as described herein above. As will be appreciated by those skilled in the art, the temperature difference between the fluid within a given TIC and the environment surrounding the given TIC will determine the type of TIC that is required in order to prevent or reduce the transfer of heat from or to the given fluid. In the non-limiting example of FIG. 5 and FIG. 6 the temperature difference between the power hydraulic fluid within the central TIC and the exhaust hydraulic fluid within the annular space 908A means that the thermal insulation properties of the central TIC can be met with the TIC 650 in order to reduce heat transfer, in this case from the exhaust hydraulic fluid to the power hydraulic fluid. However, there is a greater temperature difference between the exhaust hydraulic fluid within the annular space 908A of the intermediate TIC and the produced fluids within the annular space 910A. As such, it may be desired to utilize the TIC 600, or perhaps the TIC 675, in order to minimize the transfer of heat between the exhaust hydraulic fluid and the produced fluids.

Figure 7:
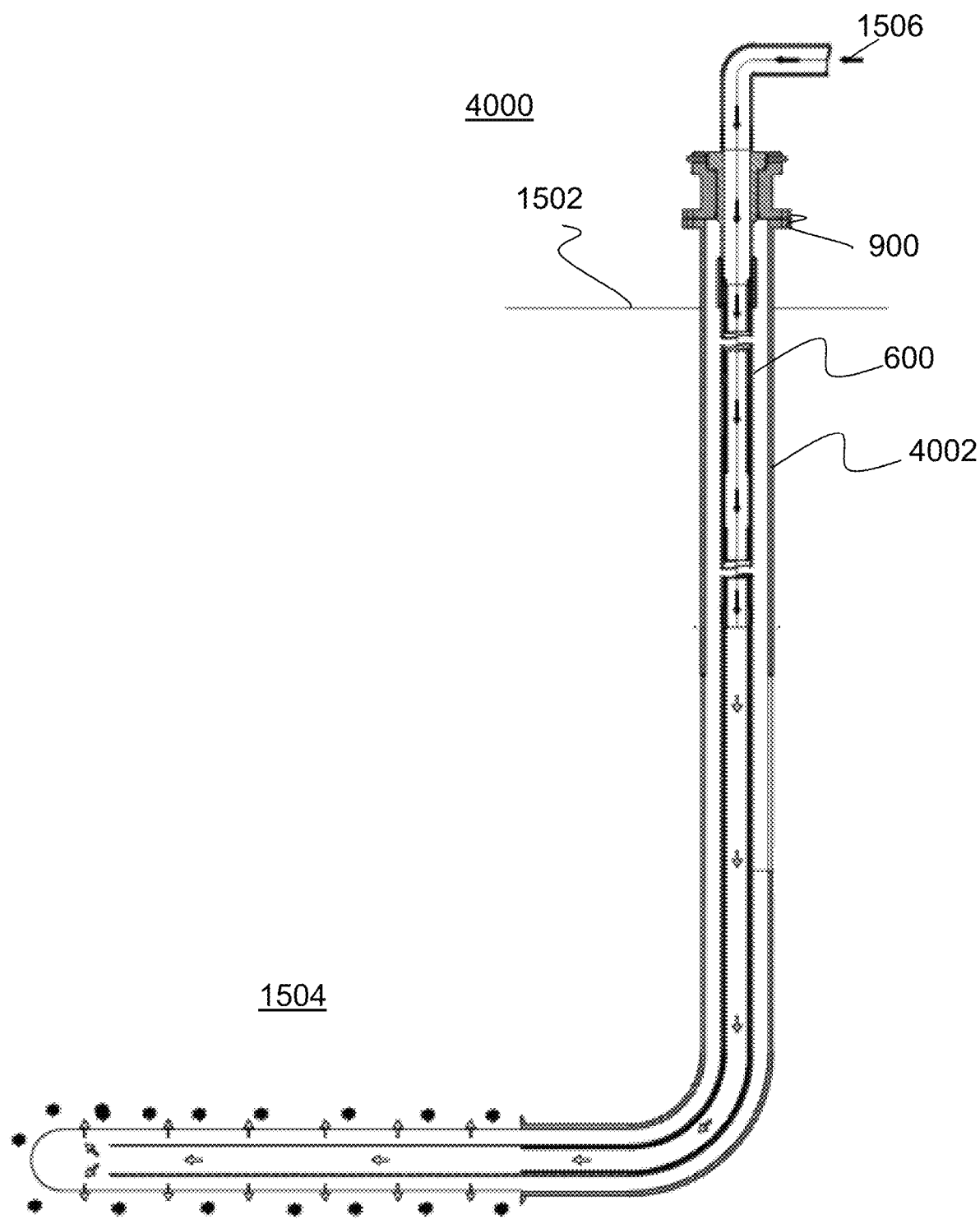
FIG. 7 is a side-elevation, mid-line cross-sectional view of another system for conducting fluid through a string of TICs, according to some embodiments of the present disclosure.

FIG. 7 shows another non-limiting example of how the TIC embodiments of the present disclosure can be deployed in a system 4000. FIG. 7 shows well conduit for delivering steam 1506 from surface 1502, via a wellhead 900, through a string of endwise connected TIC 600 to a second location 1504 that is underground, such as a reservoir of oil and/or gas. The well may be cased with a string of metal casing 4002, such as 9⅝" casing. Because the steam 1506 may have a temperature of between about 250° C. and about 300° C. (or hotter), the configuration of the deployed string of TIC 600 for delivery of steam down a well may be useful in steam assisted gravity drainage (SAGD), cyclic steam injection (CSI) or any other process whereby a hot fluid is introduced from an above-surface first location to an underground second location.

Figure 8:
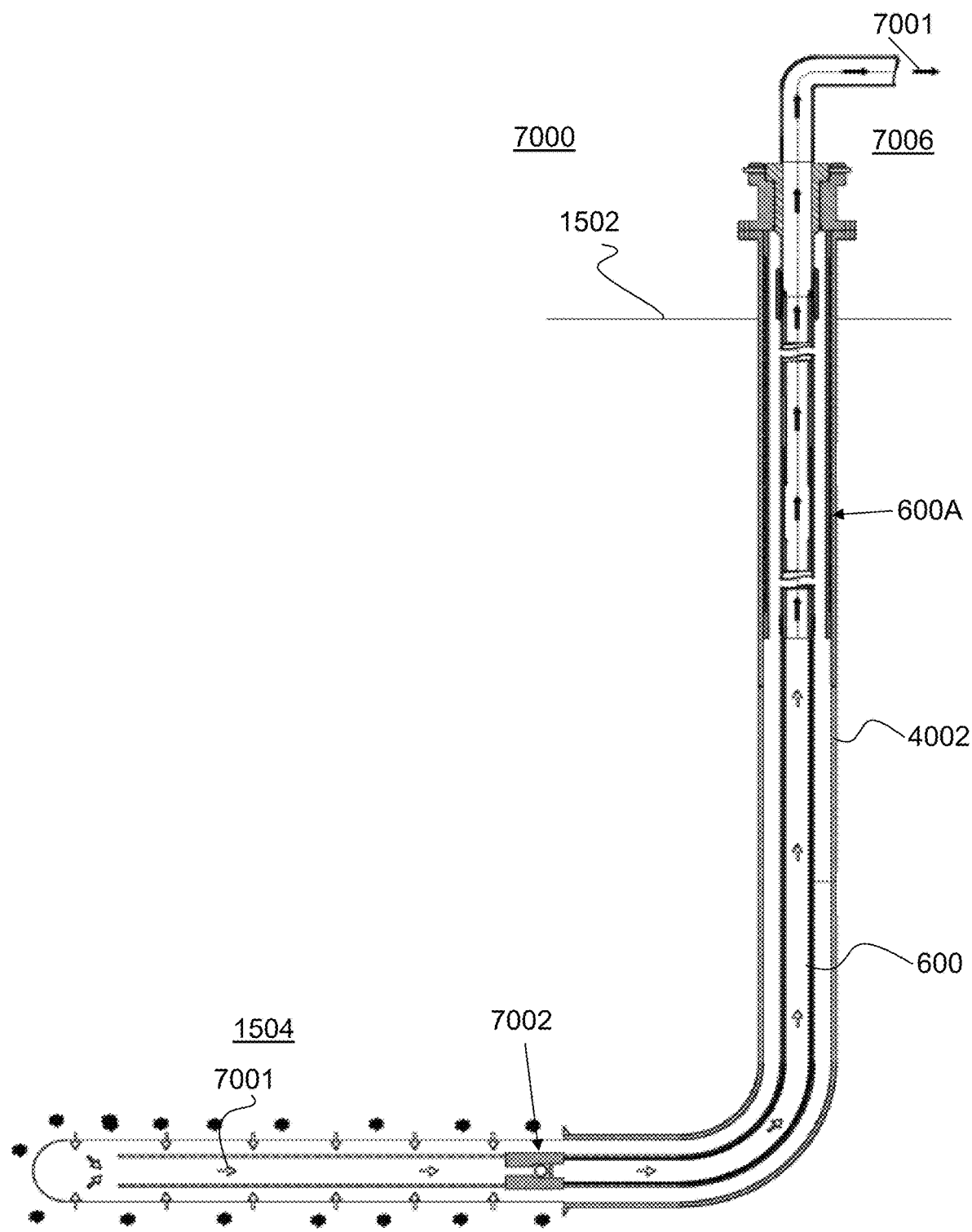
FIG. 8 is a side-elevation, mid-line cross-sectional view of another system for conducting fluid through a string of TICs, according to some embodiments of the present disclosure.

FIG. 8 shows a system 7000 that is similar to the system 4000 of FIG. 7. In system 7000 fluids 7001 are produced in the second location 1504 and conducted through a valve 7002 that is operatively coupled at or near the downhole end of the string of TIC 600. The produced fluids 7001 are then conducted from the second first location 1504 to the surface 1502 wherein a portion of the string of casing 4002 comprises a string of endwise connected TIC 600A. This embodiment of the system 4000 may be useful when the system 4000 is deployed for capturing the produced fluids 7001 that are produced due to the steam 1506 introduced into the second location 1504 by the system 4000. As such, the produced fluid 7001 may be hot and so having a portion of the casing string 4002 be TIC will assist in the produced fluid 7001 retain its thermal energy as it approaches the surface 1502.

Figure 9:
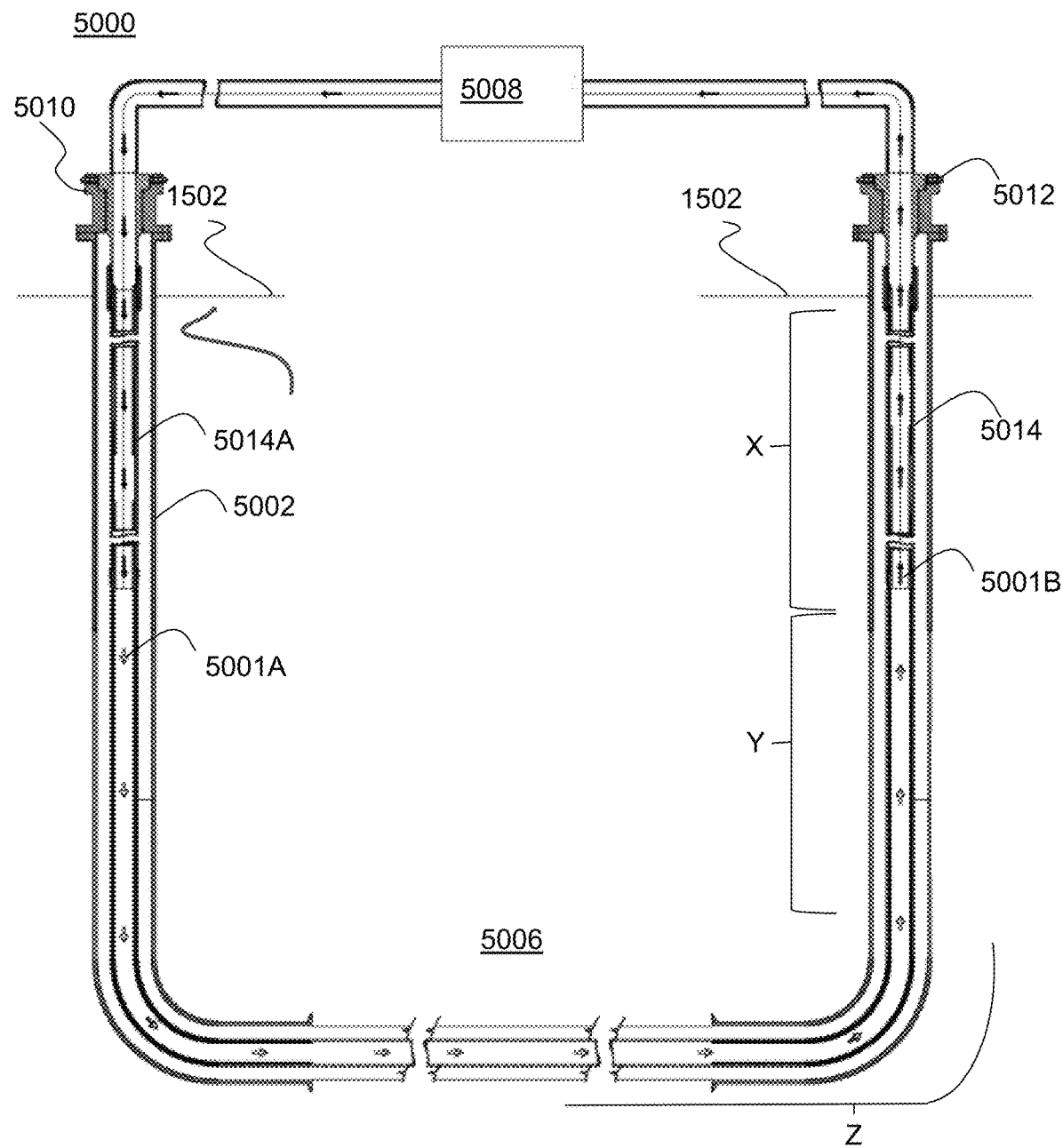
FIG. 9 is a side-elevation, mid-line cross-sectional view of another system for conducting fluid through a string of TICs, according to some embodiments of the present disclosure.

FIG. 9 shows another non-limiting example of how the TIC embodiments of the present disclosure can be deployed in a system 5000. The system 5000 is configured for heating a fluid within a deployed string of TIC, according to the embodiments of the present disclosure, at an underground first location 5006? and recovering the heat from those fluids at a below-ground first location 5006. The system 5000 may comprise a loop of casing 5002 that extends from the surface 1502 at an injection wellhead 5010 underground to the first location 5006 that is positioned proximal a geothermal hot spring where the temperature is about 100° C.-200° C. or hotter. The string of casing 5002 then extends up to the surface 1502 to a return wellhead 5012. Within the casing 5002 is a string of TIC 5014, according to the embodiments of the present disclosure. For example, the string of TIC 5014 may comprise endwise connected TIC 600 or TIC 650 or TIC 675. The string of TIC 5014 may extend between the two wellheads 5010, 5012 and the fluids therein may travel through a steam turbine power plant 5008 to generate electricity. After leaving the plant 5008, the fluids within the TIC 5014 will pass through the wellhead 5010 back to the first location 5006 to be heated again. In some embodiments of the present disclosure, a portion of the TIC 5014A between the plant 5008 and the first location 5006 may be TIC or it may be non-thermally insulated metal conduits. This is due to the fluids 5001A flowing towards the first location 5006 have already delivered their thermal energy to the plant 5008 but the fluids 5001B between the first location 5006 and the plant 5008 have been heated at the first location 5006 but have yet to be delivered to the plant 5008.

Figure 10:
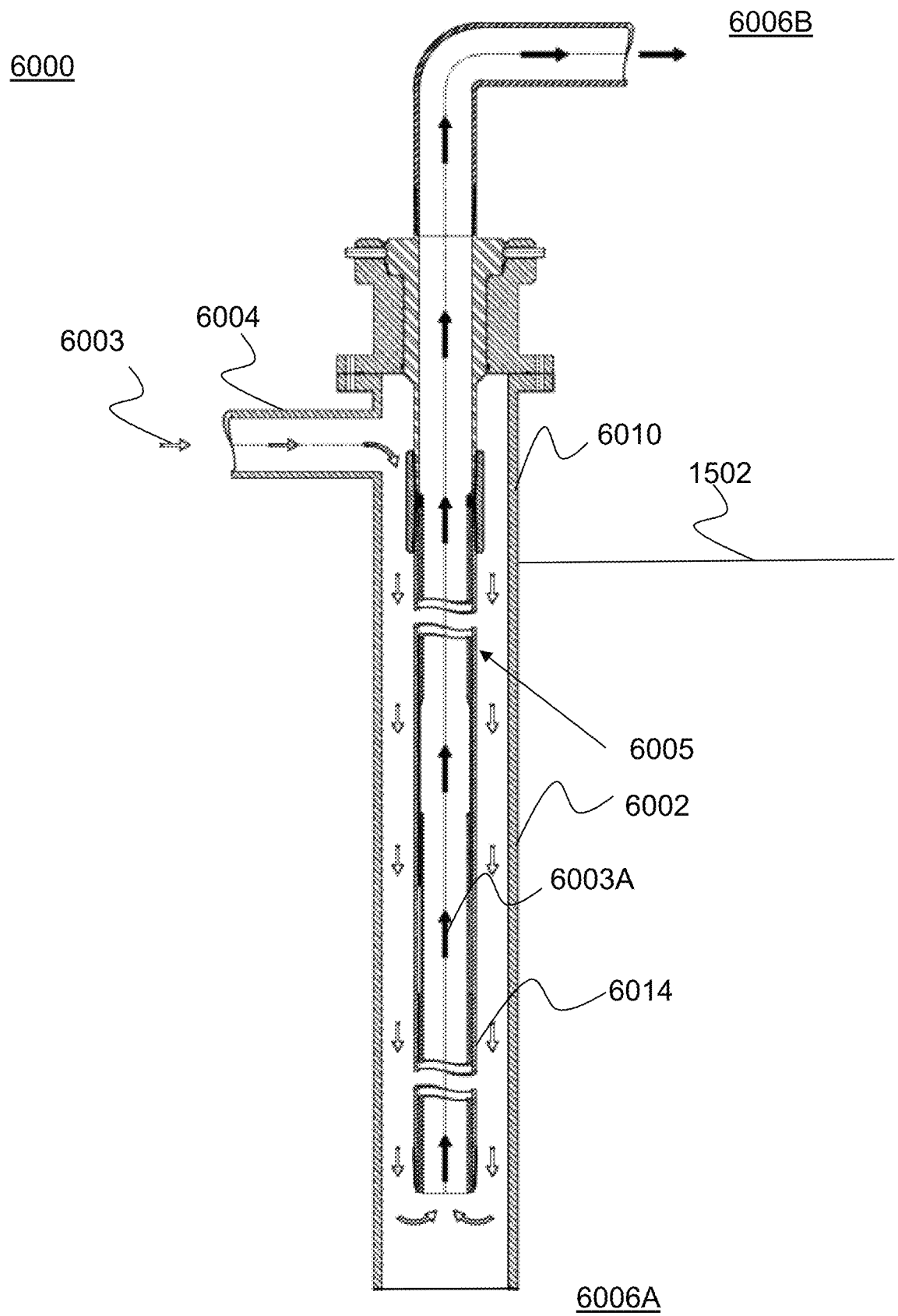
FIG. 10 is a side-elevation, mid-line cross-sectional view of another system for conducting fluid through a string of TICs, according to some embodiments of the present disclosure.

FIG. 10 shows another non-limiting example of how the TIC embodiments of the present disclosure can be deployed in a system 6000. The system 6000 is configured to deliver fluids from a first location 6004 to a second location 6006A where they are heated and then delivered to a third location 6000B. The first and third locations 6004, 6006B may be above surface and the second location 6006A may be underground. For example, the system 6000 may be used on an end of life oil and/or gas well that comprises a string of casing 6002 and that extends downhole to the second location 6006A, which is proximal to an area of mild geothermal warmth, for example around 100° C. An endwise connected string of TIC may be supported by a wellhead 6010 within the casing 6002 defining an annular space 6005 therebetween. An input fluid 6003 may be introduced into the annular space 6005 at the first location 6004 and delivered downhole to the second location 6006A where the input fluid 6003 is heated (shown as arrows 6003A) and then is delivered to the third location 6006B via the string of TIC 6014. The string of casing 6002 may be closed at the downhole end, as such a flow path from the second location 6006A to the third location 6000B is established through the open ended string of TIC 6014. As will be appreciated by those skilled in the art, the TIC within the string of TIC 6014 may be any one of the TIC described herein. For example, the string of TIC 6014 may comprise endwise connected TIC 650.

Figure 11:
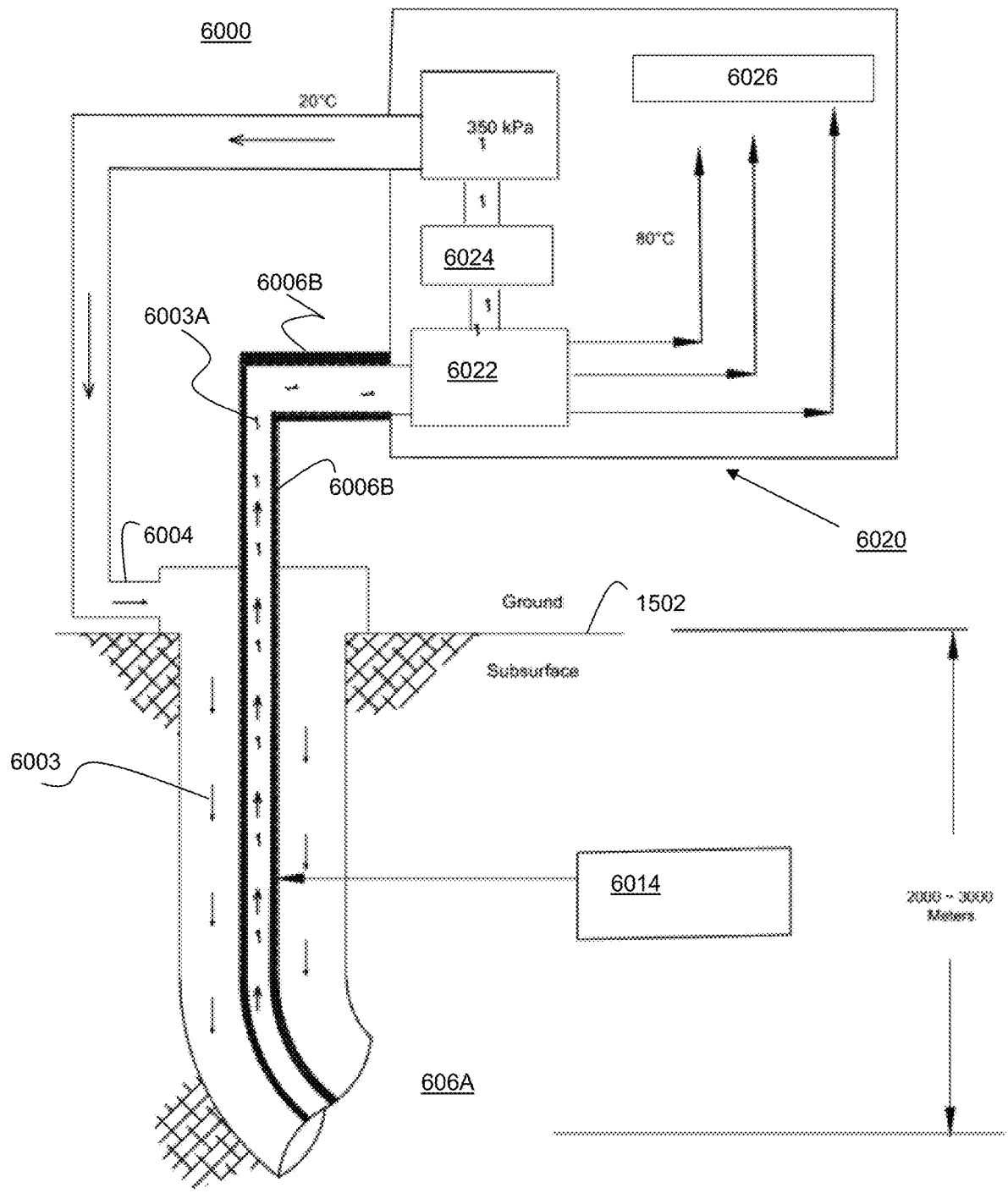
FIG. 11 is a side-elevation, mid-line cross-sectional view of another system for conducting fluid through a string of TICs, according to some embodiments of the present disclosure.

FIG. 11 shows the system 6000, wherein the fluid 6003A is delivered from the third location 6006B to a geothermal energy production facility 6020. The facility 6020 may house a heat exchanger 6022 that receives the fluid 6003A and at least some of the thermal energy within the fluid 6003A is transferred to various downstream thermoelectric devices 6026 either within the facility 6020 or elsewhere. The fluid 6003A may now be considered fluid 6003, as some, most or all of the thermal energy it acquired at the second location 6006A has now been transferred to the devices 6026. The fluid 6003 is then pressurized by a pump 6024 and re-introduced to the first location 6004. The devices 6026 are configured to utilize the transferred thermal energy to heat a building, such as a green house, an industrial building, a commercial building, a residential building, a home or the like. The devices 6026 may also use the transferred thermal energy to generate electrical power, for example by: a thermoelectric generator, which is also referred to as a Setback generator; a steam generator and steam turbine and various other types of apparatus that are configured to utilize the transferred thermal energy to general electrical power.

Figure 12:
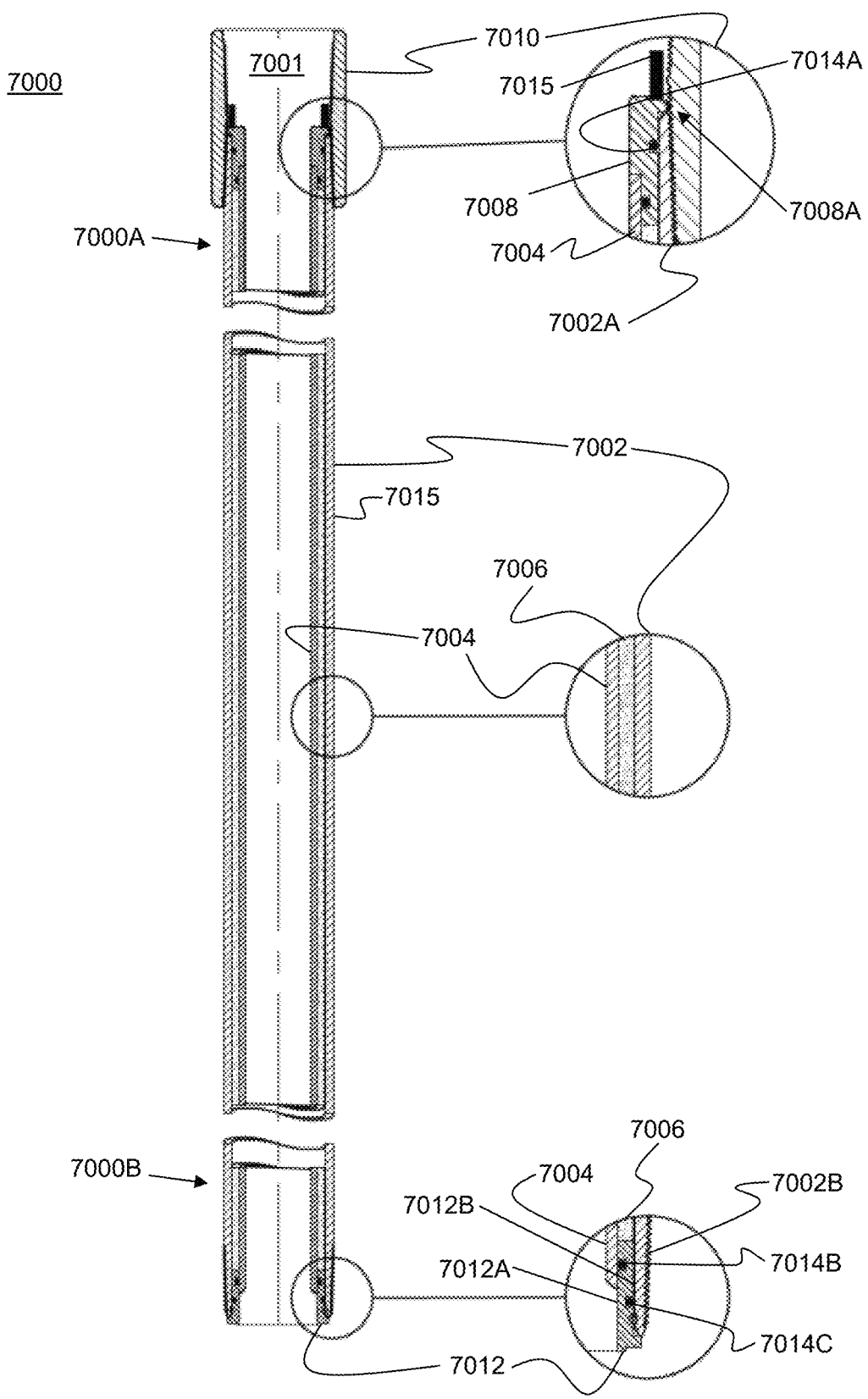
FIG. 12 is a side-elevation, mid-line cross-sectional view of another TIC, according to some embodiments of the present disclosure.

FIG. 12 shows an alternative embodiment of a TIC 7000. The TIC 7000 has a first end 7000A and an opposite second end 7000B with a fluid conveying bore 7001 defined therebetween. Each of the ends 7000A, 7000B are configured to releasably couple via a conduit connector 7010. For example, the ends 7000A, 7000B may threadably mate with an inner surface of the conduit connector 7010, so that the first end 7000A of one TIC 7000 may be releasably coupled to the second end 7000B of another TIC 7000 or another TIC, as described herein or another section of metal conduit.

The TIC 7000 has many similar features to the TIC 600 shown in the non-limiting example of FIG. 1. While the TIC 600 of FIG. 0.1 has at least a two-piece, slidable first layer 601, the TIC 7000 of FIG. 23 has combined the slidable two-pieces 601 into a single, inner sleeve 7004 that is slidable towards and away from the end cap 7012. As will be appreciated by those skilled in the art, the end caps described herein may be of a unitary construction or multiple components may be operatively coupled together to form the end caps described herein. The TIC 7000 comprises an outer metal conduit 7002 and an inner sleeve 7004. The outer metal conduit 7002 may be the same as the metal conduit feature described in relation to other TICs described herein. The inner sleeve 7004 defines a first end cap 7008 and a second end cap 7012. These end caps 7008, 7012 may be integral with the rest of the inner sleeve 7004 or they may be separate components that are operatively coupled to the ends of the inner sleeve 7004. The portion of the inner sleeve 7004 that extends between the end caps 7008, 7012 may have an outer diameter that is smaller than the inner diameter of the metal conduit 7002 and the outer diameter of the end caps 7008, 7012 may also be larger than the outer diameter of the inner sleeve 7004 and smaller than the inner diameter of the metal conduit 7002, such that an outer surface of the inner sleeve 7004 is spaced apart from an inner surface of the metal conduit 7002 to define an annular gap therebetween. In some embodiments of the present disclosure, the annular gap between the metal conduit 7002 and the inner sleeve is filled with a TIM 7006, such as: aerogel, calcium silicate, cotton wool, cotton wool insulation, felt insulation, fiberglass, formed plastic, polystyrene, sheep wool, silica gel, Styrofoam, urethane foam, wool felt or any combinations thereof.

As shown in the non-limiting example of FIG. 12 in the zoomed in section within the upper oval, the first end cap 7008 may be integral with the inner sleeve 7004 and it defines a shoulder 7008A that abuts against the inner surface of the metal conduit 7002. The abutting surface of the end cap 7008 may define a gland for housing a sealing member 7014A so as to provide a fluid tight seal between the first end 7002A when it abuts the end cap 7008. The end cap 7008 may also define an end face 7008B that further defines a further gland for housing a portion of an inter-conduit sealing member 7015.

In some embodiments of the present disclosure, the inner sleeve 7004 is constructed of a rigid material that is suitable for the pressures and temperatures of applications where the TIC 7000 may be deployed. For example, the inner sleeve 7004 may be made of steel, polytetrafluoroethylene (PTFE) polymer composites or any combination thereof. In some embodiments of the present disclosure, the inner sleeve may be constructed in the shape of a cylinder (or a tube). The materials that the inner sleeve is made of will also provide a measure of physical protection of the layer of TIMs 7006

Figure 13:
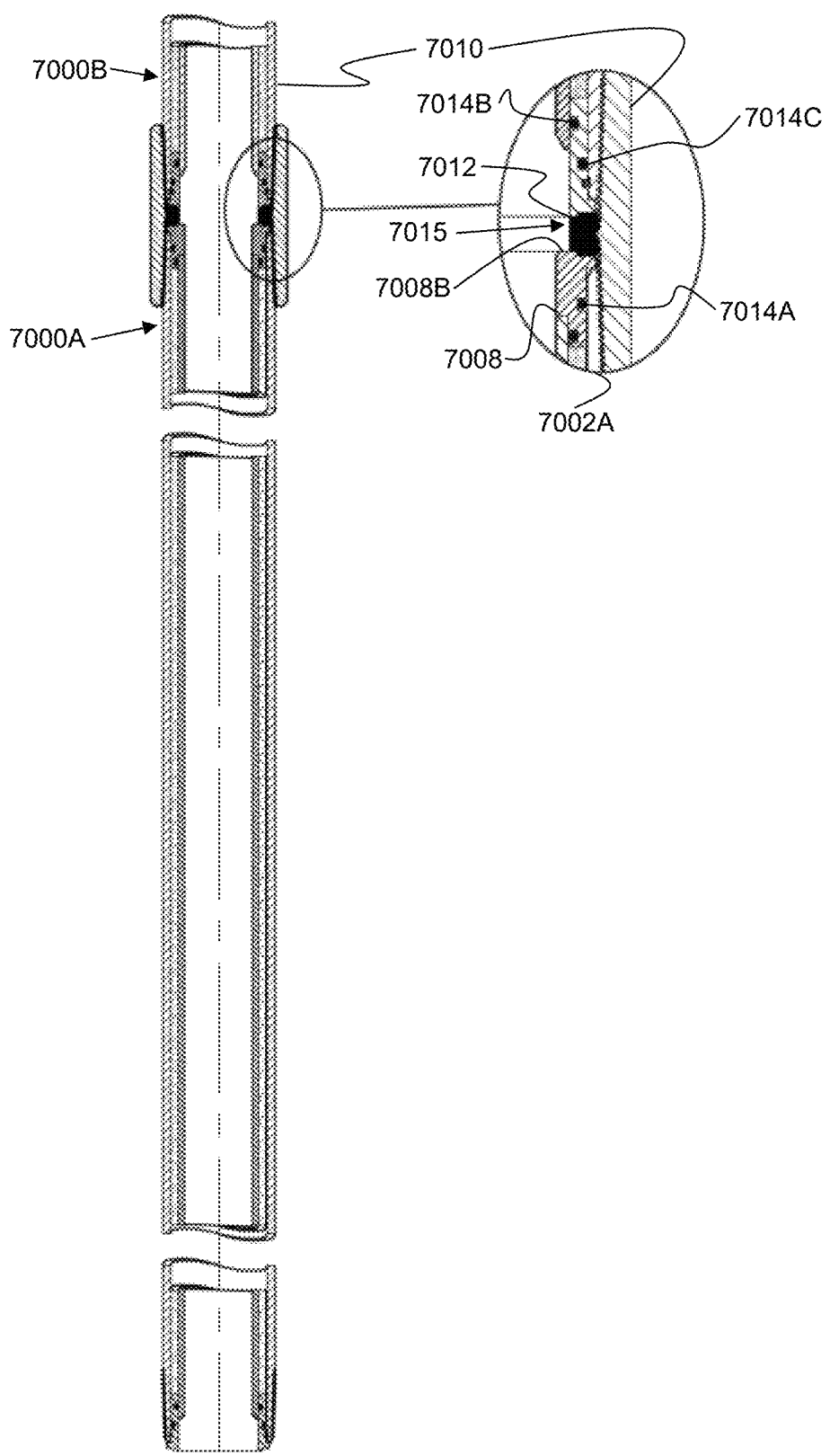
FIG. 13 is a side-elevation, mid-line cross-sectional view of the TIC of FIG. 12 coupled to another TIC, according to some embodiments of the present disclosure.

FIG. 13 shows a first end 7000A of one TIC 7000 releasably coupled to a second end 7000B of another TIC 7000 via the connector 7010. As shown in the zoomed in view of the upper oval, the two TICs 7000 are releasably coupled in a fluid tight fashion due to the inter-conduit sealing member 7015 being compressed between the end face 7008B of the lower TIC 7000 and the end cap 7012 of the upper TIC 7000.

As shown in the non-limiting example of FIG. 12 in the zoomed in section within the lower oval, the second end cap 7012 is not integral with the inner sleeve 7004 and it defines an inner surface 7012A that is operatively couplable to the second end of the inner sleeve 7004 and an outer surface 7012B that is operatively coupled with the second end 7002B. The inner surface 7012A defines one or more glands each for housing a sealing member 7014B that is configured to provide a fluid tight seal between the inner surface 7012A and the inner sleeve 7004. The outer surface 7012B defines one or more glands each for housing a sealing member 7014C that is configured to provide a fluid tight seal between the outer surface 7012B and the second end 7002B.

Figure 14:
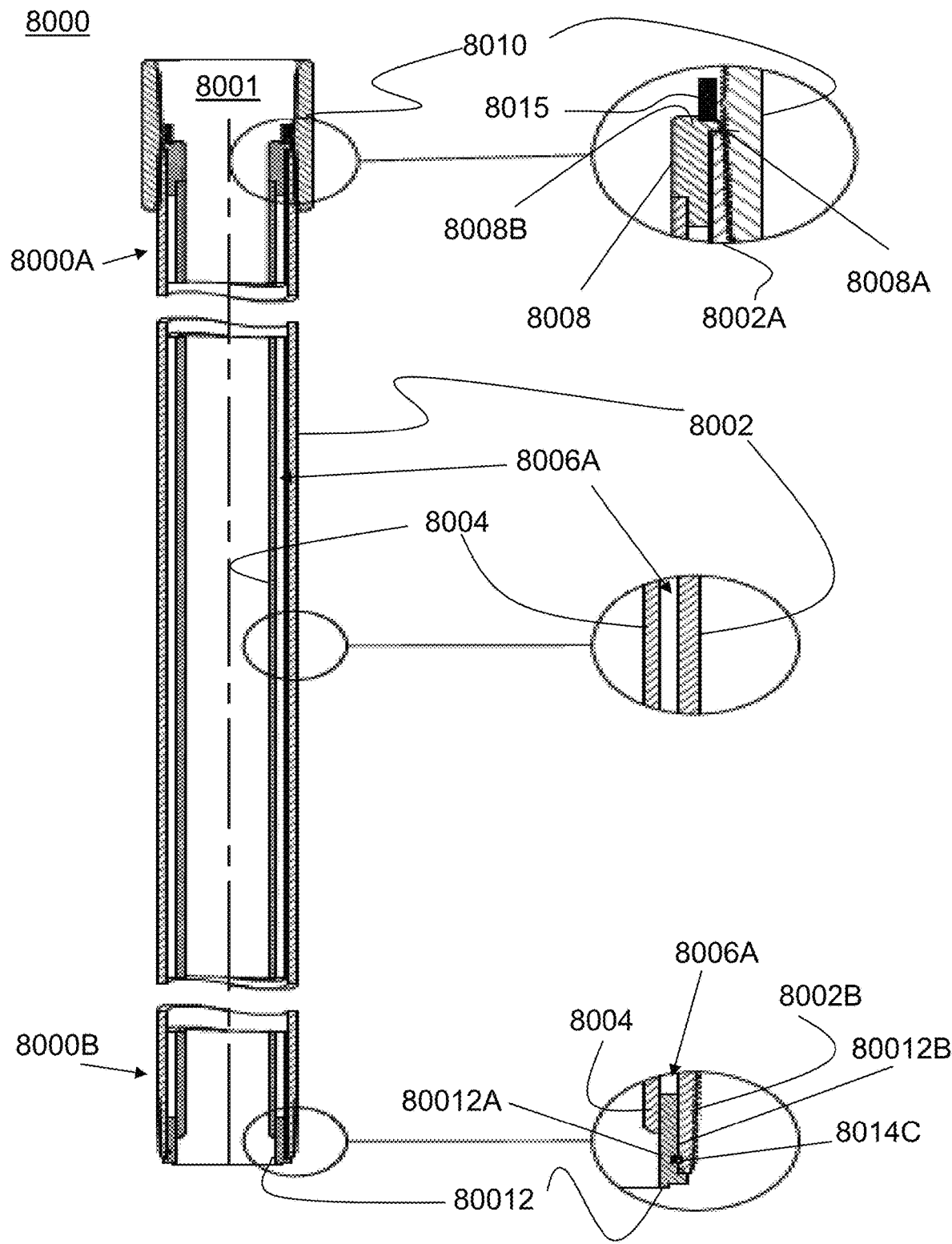
FIG. 14 is a side-elevation, mid-line cross-sectional view of another TIC, according to some embodiments of the present disclosure.

FIG. 14 shows an alternative embodiment of a TIC 8000 for use in scenarios where the fluids being conveyed from a deep geothermal source, such as between about 4000 meters and 5000 meters deep or deeper TIC 8000 in FIG. 14 is simpler version of TIC 7000 in FIG. 12 with TIC 8000 having TIM 7006 layer removed along with its sealing elements. The TIC 8000 has a first end 8000A and an opposite second end 8000B with a fluid conveying bore 8001 defined therebetween. Each of the ends 8000A, 8000B are configured to releasably couple via a conduit connector 8010. For example, the ends 8000A, 8000B may threadably mate with an inner surface of the conduit connector 8010, so that the first end 8000A of one TIC 8000 may be releasably coupled to the second end 8000B of another TIC 8000 or another TIC, as described herein or another section of metal conduit.

The TIC 8000 has many similar, if not the same features as the other TICs described herein. The TIC 8000 comprises an outer metal conduit 8002 and an inner sleeve 8004. The outer metal conduit 8002 may be the same as the metal conduit feature described in relation to other TICs described herein. The TIC 8000 further comprises a first end cap 8008 and a second end cap 8012. These end caps 8008, 8012 may be integral with the inner sleeve 8004 or they may be separate components that are operatively coupled to the ends of the inner sleeve 8004. The portion of the inner sleeve 8004 that extends between the end caps 8008, 8012 may have an outer diameter that is smaller than the inner diameter of the metal conduit 8002 and the outer diameter of the end caps 8008, 8012 may also be larger than the outer diameter of the inner sleeve 8004 and smaller than the inner diameter of the metal conduit 8002, such that an outer surface of the inner sleeve 8004 is spaced apart from an inner surface of the metal conduit 8002 to define an annular gap 8006A therebetween.

In some embodiments of the present disclosure, the inner sleeve 8004 is constructed of a rigid material that is suitable for the pressures and temperatures of applications where the TIC 7000 may be deployed. For example, the inner sleeve 8004 may be made of steel, fiber glass, polytetrafluoroethylene (PTFE) polymer composites or any combination thereof. In some embodiments of the present disclosure, the inner sleeve may be constructed in the shape of a cylinder (or a tube) with an outer diameter that is spaced from the inner surface of the metal conduit 8002.

Figure 15:
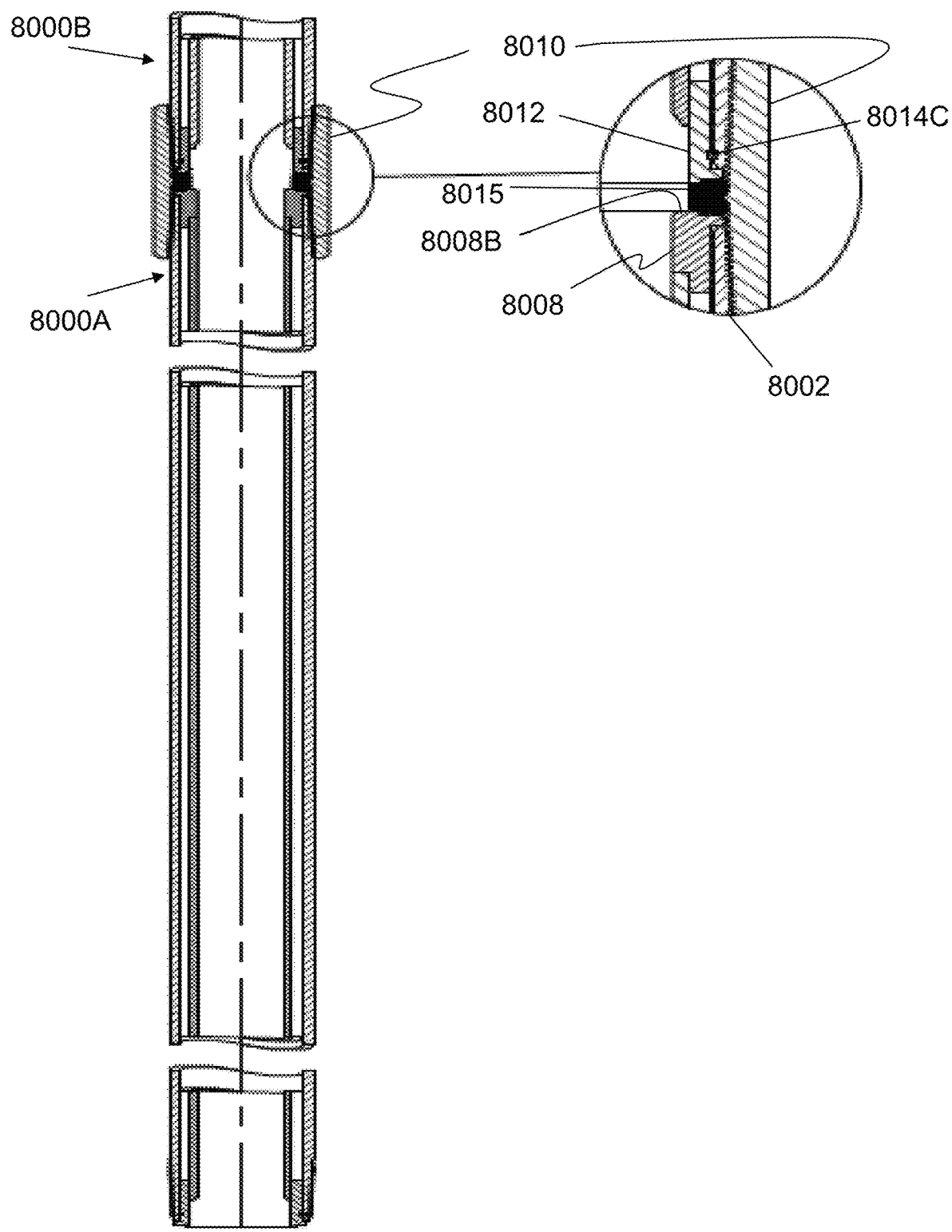
FIG. 15 is a side-elevation, mid-line cross-sectional view of the TIC of FIG. 14 coupled to another TIC, according to some embodiments of the present disclosure.

FIG. 15 shows a first end 8000A of one TIC 8000 releasably coupled to a second end 8000B of another TIC 8000 via the connector 8010. As shown in the zoomed in view of the upper oval, the two TICs 8000 are releasably coupled in a fluid tight fashion due to the inter-conduit sealing member 8015 being compressed between the end face 8008B of the lower TIC 8000 and the end cap 8012 of the upper TIC 8000.

As will be appreciated by those skilled in the art, a difference between the TIC 7000 and the TIC 8000 is that TIC 8000 is lacking the sealing members positioned between the end cap 8008 and inner sleeve 8004 and the sealing members inner surface 8012A and the inner sleeve 8004. The result of this difference is that the fluids within the bore 8001 can access a gap 8006A that is defined between the inner sleeve 8004 and the metal conduit 8002. The fluid, typically water based, may provide a measure of thermal insulation between the bore 8001 and outside of the TIC 8000, such that the fluid conveyed by the bore 8001 is the TIM of the TIC 8000. As described hereinabove, the TIC 8000 may be suitable for deployment in deep portions of a geothermal installation, as such the temperature differential between the fluids within the TIC 8000 and the surrounding underground will be small or negligible.

Figure 16:
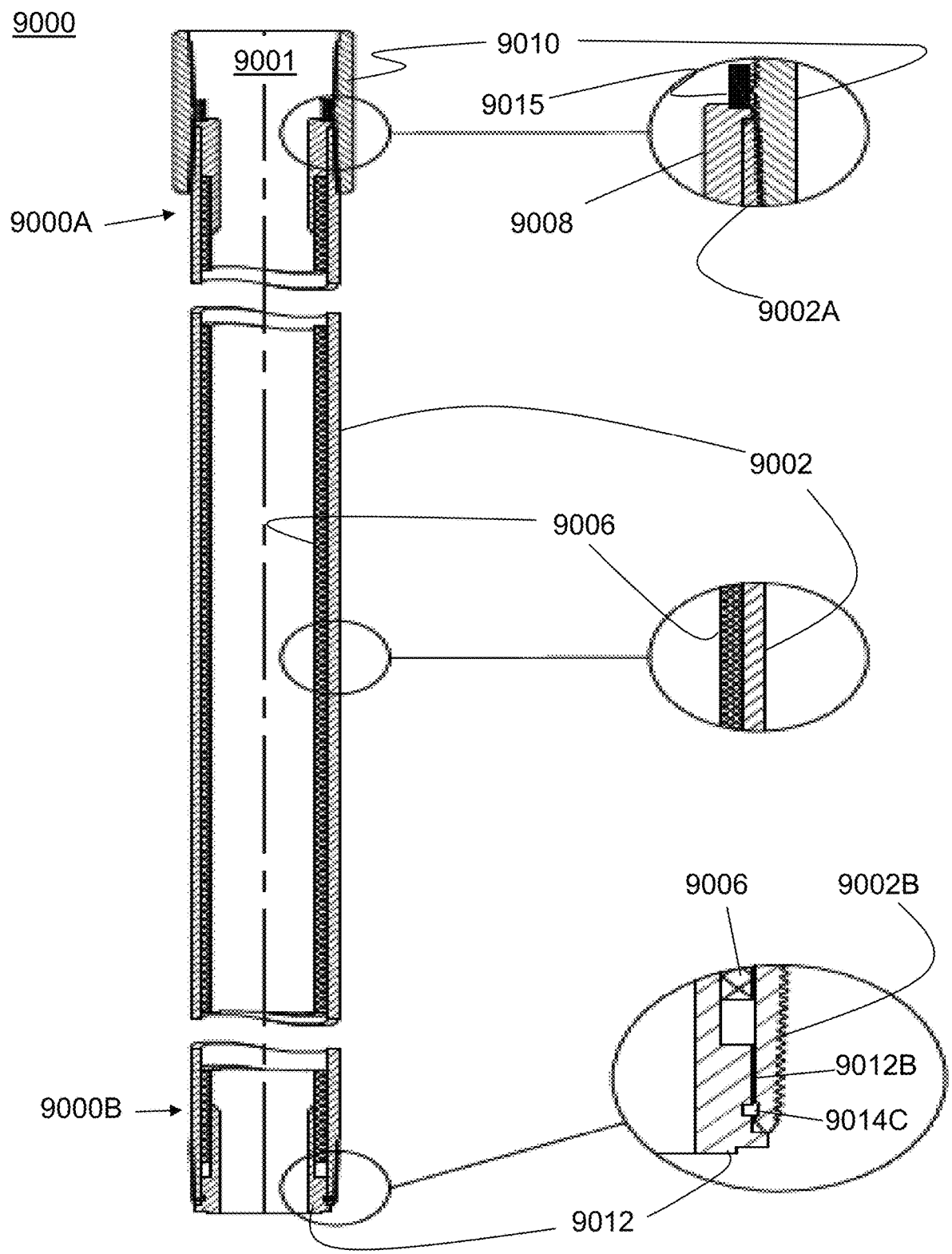
FIG. 16 is a side-elevation, mid-line cross-sectional view of another TIC, according to some embodiments of the present disclosure.

FIG. 16 shows an alternative embodiment of a TIC 9000 for use in scenarios where the fluids being conveyed from a geothermal source that is shallowed than described above in respect of the TIC 8000. For example, the shallowed geothermal source may be between the surface and 3000 meters deep and the temperature may be up to 100° C. or below. The TIC 9000 has a first end 9000A and an opposite second end 9000B with a fluid conveying bore 9001 defined therebetween. Each of the ends 9000A, 9000B are configured to releasably couple via a conduit connector 9010. For example, the ends 9000A, 9000B may threadably mate with an inner surface of the conduit connector 9010, so that the first end 9000A of one TIC 9000 may be releasably coupled to the second end 9000B of another TIC 9000 or another TIC, as described herein or another section of metal conduit.

The TIC 9000 has many similar, if not the same, features as the other TICs described herein. The TIC 9000 comprises an outer metal conduit 9002 and a layer of TIM 9006. The metal conduit 9002 may be the same as the metal conduit feature described in relation to other TICs described herein.

The TIC 9000 also comprises a first end cap 9008 and a second end cap 9012. The layer of TIM 9006 may be made of a rigid material with thermal insulation properties, such as but not limited to: polytetrafluoroethylene (PTFE), fiberglass, formed plastic, or any combinations thereof As shown in the non-limiting example of FIG. 16 in the zoomed-in section within the upper oval, the first end cap 9008 is not integral with the inner sleeve 9006 and it defines a shoulder 9008A that abuts against the inner surface of the metal conduit 9002. The end cap 9008 may also define an end face 9008B that further defines a further gland for housing a portion of an inter-conduit sealing member 9015.

As shown in the non-limiting example of FIG. 16 in the zoomed-in section within the lower oval, the second end cap 9012 defines an outer surface 9012B that is operatively coupled with the second end 9002B. The outer surface 9012B comprises a snap ring 9014C that holds the outer surface 9012B to the second end 9002B.

Figure 17:
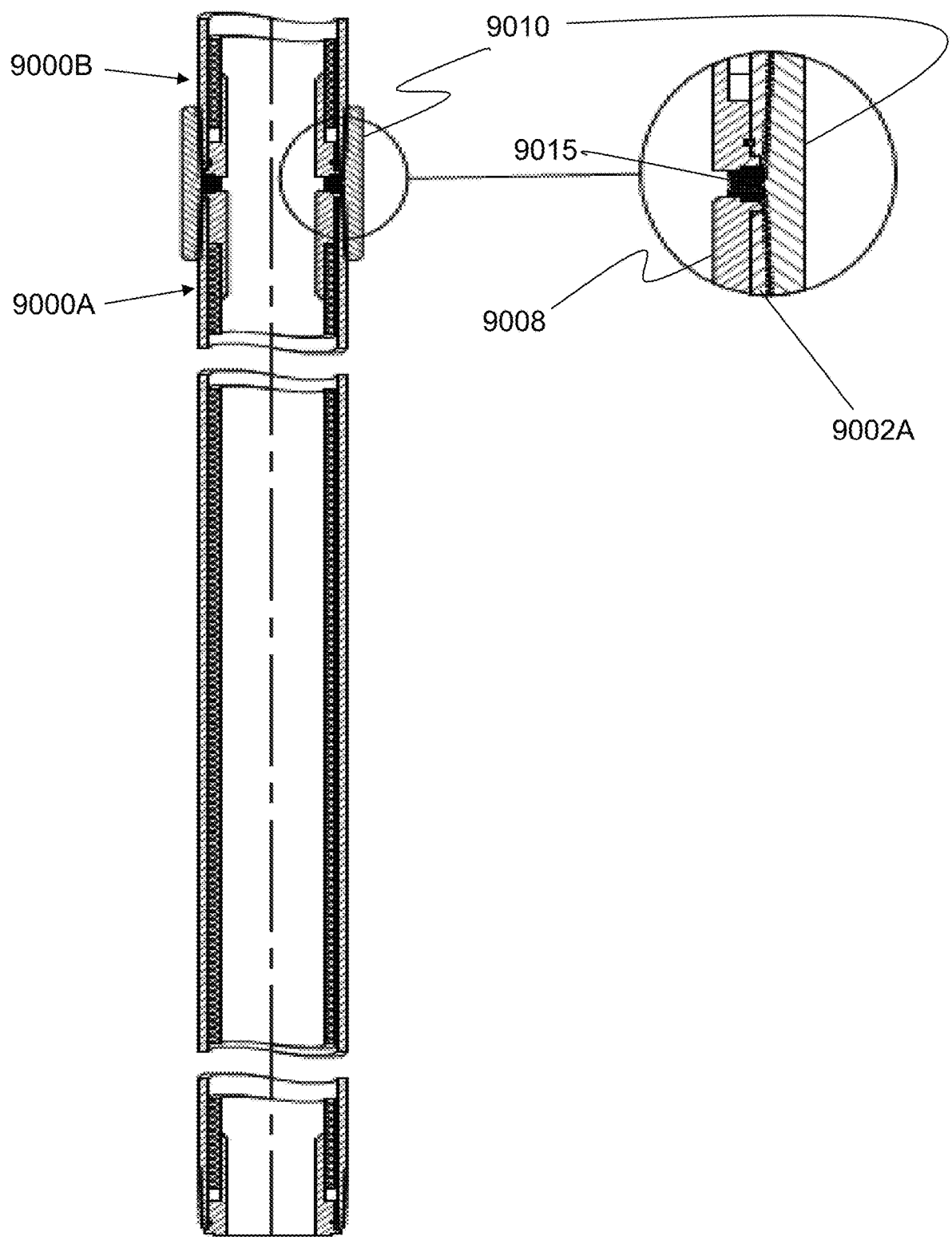
FIG. 17 is a side-elevation, mid-line cross-sectional view of the TIC of FIG. 16 coupled to another TIC, according to some embodiments of the present disclosure.

FIG. 17 shows a first end 9000A of one TIC 9000 releasably coupled to a second end 9000B of another TIC 9000 via the connector 9010. As shown in the zoomed in view of the upper oval, the two TICs 9000 are releasably coupled in a fluid tight fashion due to the inter-conduit sealing member 9015 being compressed between the end face 9008B of the lower TIC 9000 and the end cap 9012 of the upper TIC 9000.

As will be appreciated by those skilled in the art, a difference between the TIC 8000 and the TIC 9000 is that the TIC 9000 has a layer of TIM and it does not have an inner sleeve. As such, the layer of TIM 9006 will be in contact with the fluid being conveyed within the bore 9001.

Figure 18:
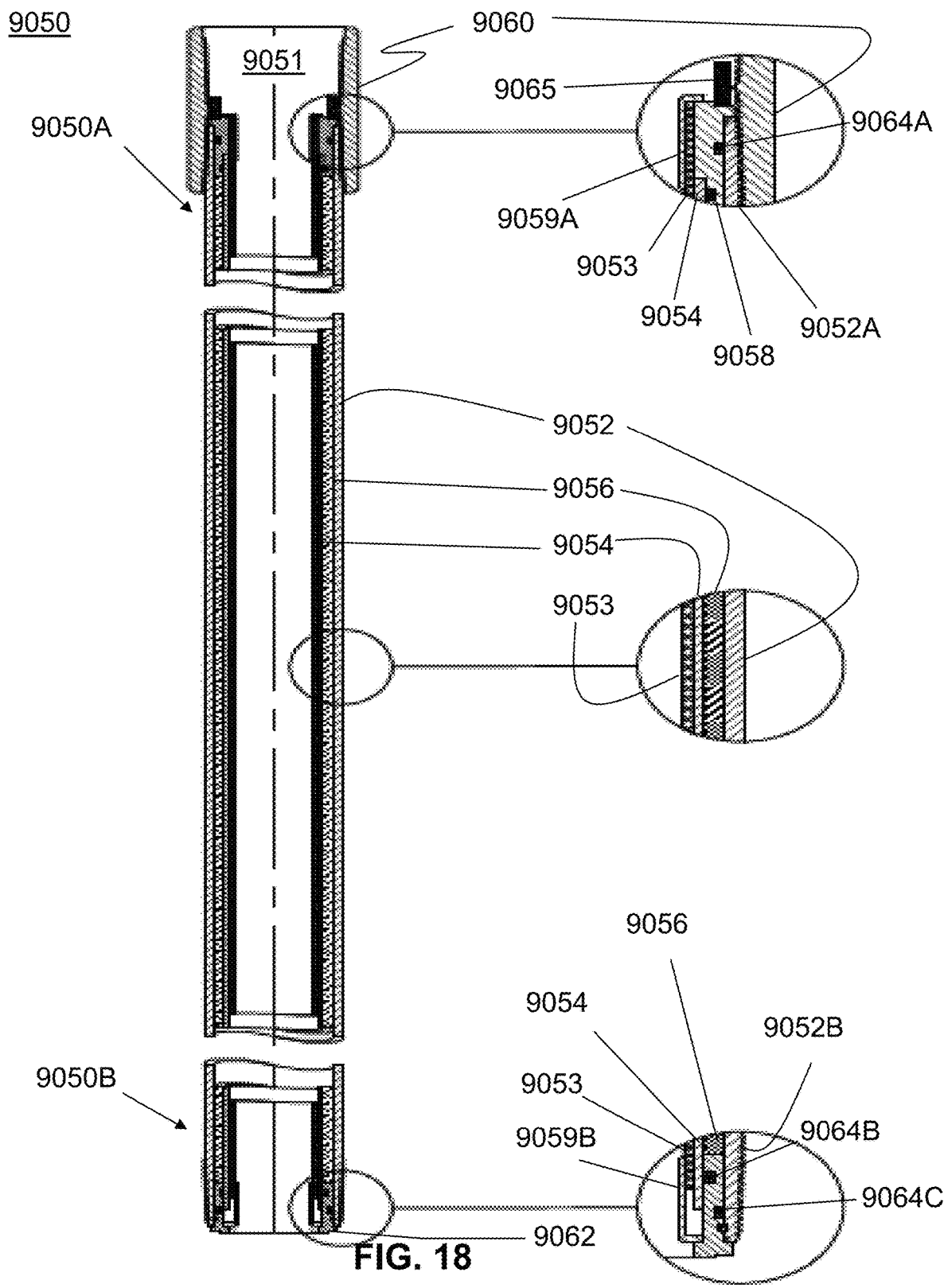
FIG. 18 is a side-elevation, mid-line cross-sectional view of another TIC, according to some embodiments of the present disclosure.

FIG. 18 shows an alternative embodiment of a TIC 9050, which is similar to the TIC 7000 of FIG. 12, except that the TIC 9050 has an additional inner layer of TIM.

FIG. 18 shows an alternative embodiment of a TIC 9050 for use in scenarios where the fluids being conveyed have a large temperature difference from the environment through which they are being conducted, for example the fluids may be produced fluids from a steam-assisted gravity drainage operation and the surrounding environment may be a cold geological formation. The temperature difference between wellbore fluid and surrounding environment could be 200° C. The TIC 9050 has a first end 9050A and an opposite second end 9050B with a fluid conveying bore 9051 defined therebetween. Each of the ends 9050A, 9050B are configured to releasably couple via a conduit connector 9060. For example, the ends 9050A, 9050B may threadably mate with an inner surface of the conduit connector 9060, so that the first end 9050A of one TIC 9000 may be releasably coupled to the second end 9050B of another TIC 9050 or another TIC, as described herein or another section of metal conduit.

The TIC 9050 has many similarities to the TIC 7000 in FIG. 12, if not the same, features as the other TICs described herein. The only difference with TIC 7000 is that TIC 9050 has an inner insulation sleeve 9053 and its assembling components, such as the end cap may be different. The TIC 9050 comprises an outer metal conduit 9052, a first layer of TIM 9054, a second layer of TIM 9056 and an inner sleeve 9053. The metal conduit 9052 may be the same as the metal conduit feature described in relation to other TICs described herein. The TIC 9050 also comprises a first end cap 9058 and a second end cap 9062. The first layer of TIM 9054 may be: polytetrafluoroethylene (PTFE), calcium silicate, cotton wool, cotton wool insulation, felt insulation, fiberglass, formed plastic, polystyrene, sheep wool, silica gel, Styrofoam, urethane foam, wool felt or any combination thereof. The second layer of TIM 9056 may be made of an aerogel, cotton wool, cotton wool insulation, felt insulation, sheep wool, silica gel, Styrofoam, urethane foam, wool felt or any combination thereof. The inner sleeve 9053 may be positioned interior to the two layers of TIM 9054, 9056 and retained in a desired position by a first clip 9059A that is operatively coupled to the first end cap 9058 and a second clip 9059B that is operatively coupled to the second end cap 9062.

As described herein above in regards to the TIC 7000, the first end cap 9058 defines one or more glands for housing a sealing member 9014A that provides a fluid tight seal between the end cap 9058 and the first layer of TIM 9054. The second end cap 9062 also defines one or more glands each for housing a sealing member for providing a fluid tight seal. For example a sealing member 9064B may provide a fluid tight seal between the second end cap 9062 and the first layer of TIMs 9054 and a sealing member 9064C may provide a fluid tight seal between the second end cap 9062 and the second end 9052B.

Figure 19:
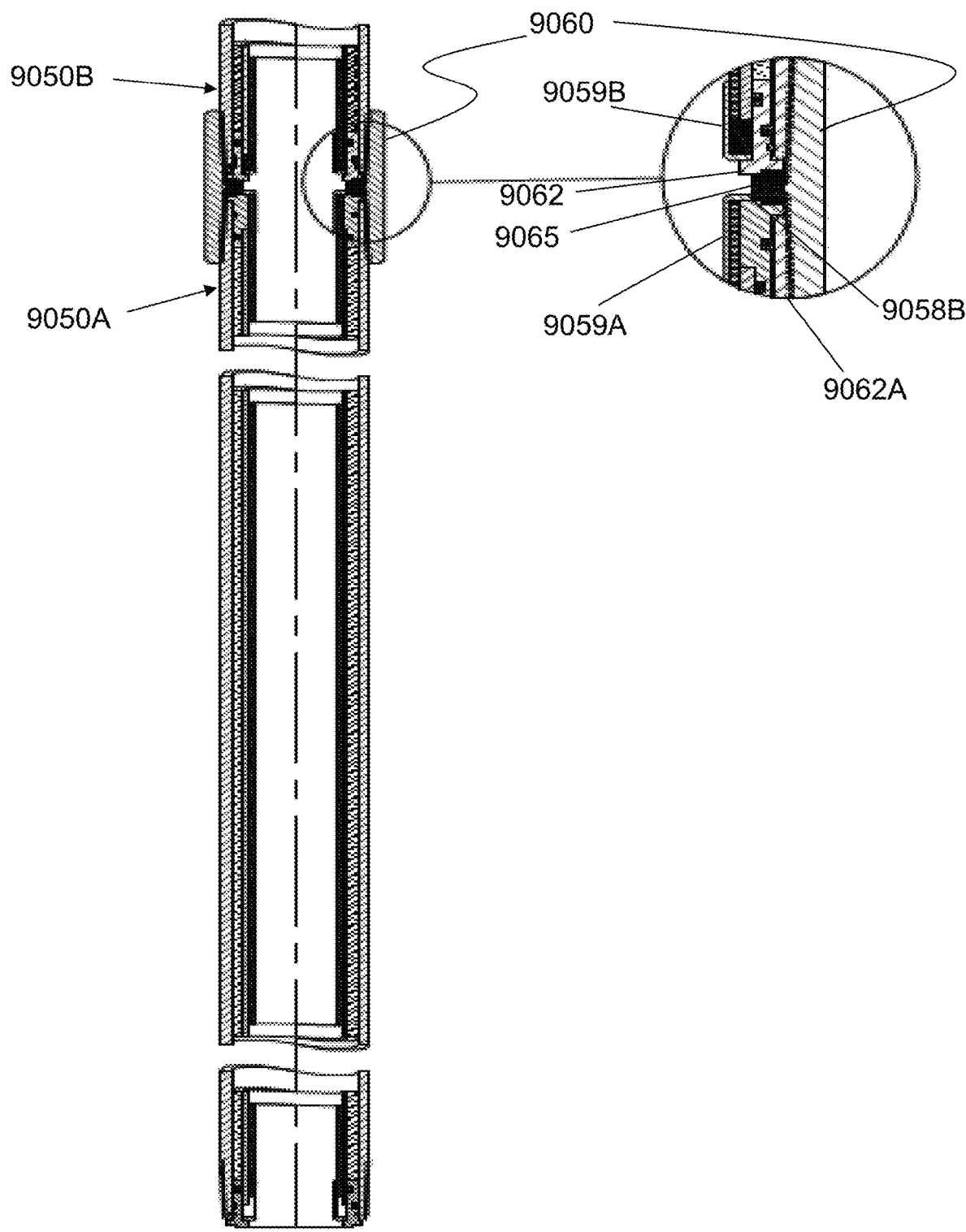
FIG. 19 is a side-elevation, mid-line cross-sectional view of the TIC of FIG. 18 coupled to another TIC, according to some embodiments of the present disclosure.

FIG. 19 shows a first end 9050A of one TIC 9050 releasably coupled to a second end 9050B of another TIC 9050 via the connector 9060. As shown in the zoomed in view of the upper oval, the two TICs 9050 are releasably coupled in a fluid tight fashion due to the inter-conduit sealing member 9065 being compressed between an end face 9008B of the lower TIC 9000 and the end cap 9062 of the upper TIC 9000.

Figure 20:
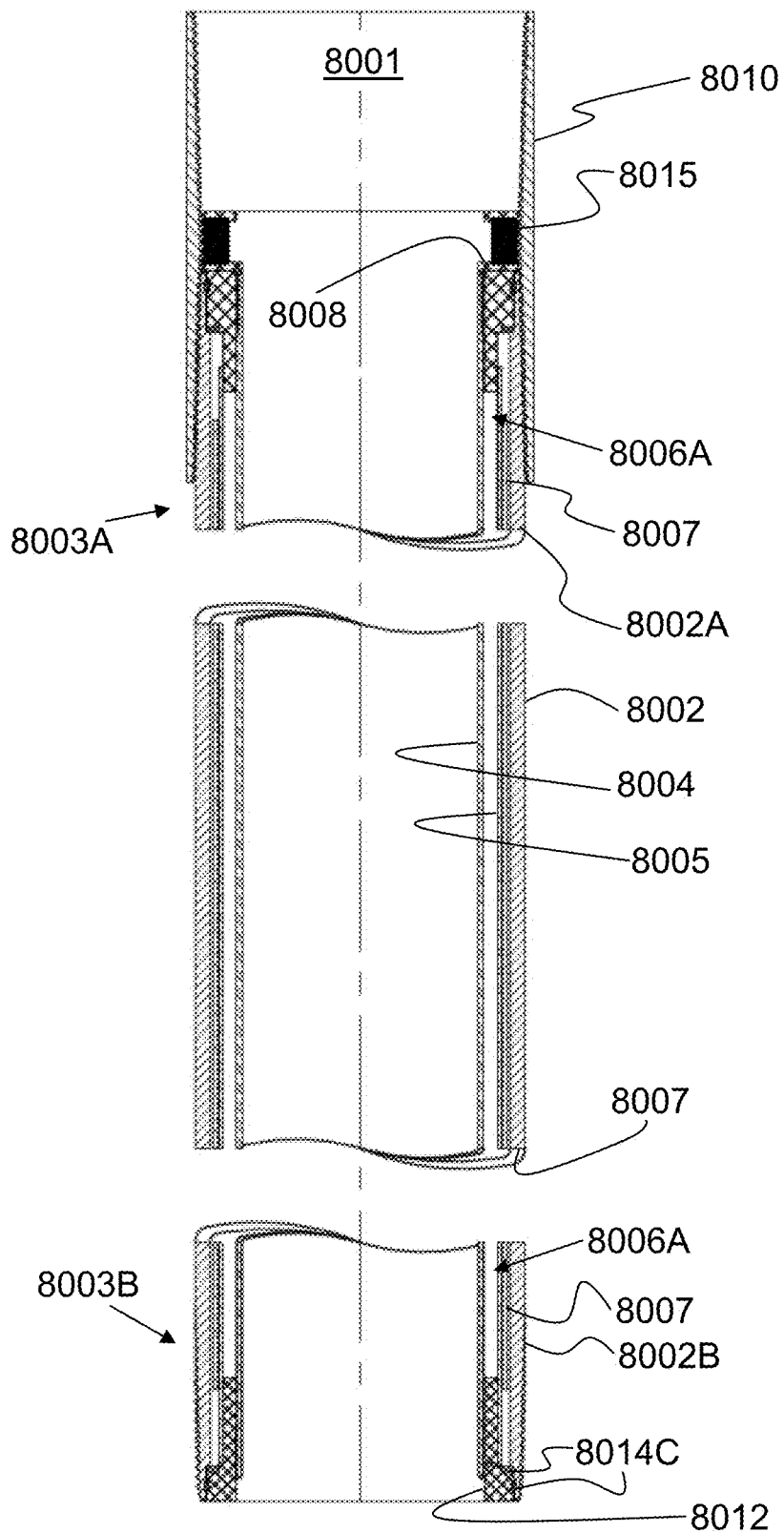
FIG. 20 is a side-elevation, mid-line cross-sectional view of another TIC, according to some embodiments of the present disclosure.

FIG. 20 shows an alternative embodiment of a TIC 8003. TIC 8003 is a variation of the TIC 8000 shown in FIG. 25, with TIC 8003 having additional layers 8005 and 8007 that are set on the bottom of the end cap 8012. TIC 8003 is used during SAGD steam injection, during which steam that has a temperature up to 300° C. and up to 7 MPa pressure may occupy within the annular gap 8006A, where the steam creates a highly-efficient thermal insulation layer. The additional layers 8005 and 8007 are another layer of thermal insulation to reduce the heat loss of the static steam in annular gap 8006A to outside of the metal conduit 8002. In the event any of the steam condenses to water within the annular gap 8006A, the water will drain back into conveying bore 8001 and evaporate to steam again. The TIC 8003 has a first end 8003A and an opposite second end 8003B with a fluid conveying bore 8001 defined therebetween. Each of the ends 8003A, 8003B are configured to releasably couple via a conduit connector 8010. For example, the ends 8003A, 8003B may threadably mate with an inner surface of the conduit connector 8010, so that the first end 8003A of one TIC 8003 may be releasably coupled to the second end 8003B of another TIC 8003 or another TIC, as described herein or another section of metal conduit.

As shown in the non-limiting example of FIG. 20 in the zoomed-in section within the upper oval, the first end cap 8008 may or may not be integral with the inner sleeve 8004 and it defines a shoulder 8008A that abuts against the inner surface of the metal conduit 8002. The end cap 8008 may also define an end face 8008B that further defines a further gland for housing a portion of an inter-conduit sealing member 8015.

As shown in the non-limiting example of FIG. 20 in the zoomed-in section within the lower oval, the second end cap 8012 is not integral with the inner sleeve 8004 and it defines an inner surface 8012A that is operatively couplable to the second end of the inner sleeve 8004 and an outer surface 8012B that is operatively coupled with the second end 8002B. The outer surface 8012B defines one or more glands each for housing snap ring 8014C that is configured to hold the second end cap 8012 at the second end 8002B.

In some embodiments of the present disclosure, the inner sleeve 8004 is constructed of a rigid material that is suitable for the pressures and temperatures of applications where the TIC 7000 may be deployed. For example, the inner sleeve 7004 may be made of steel.

Figure 21:
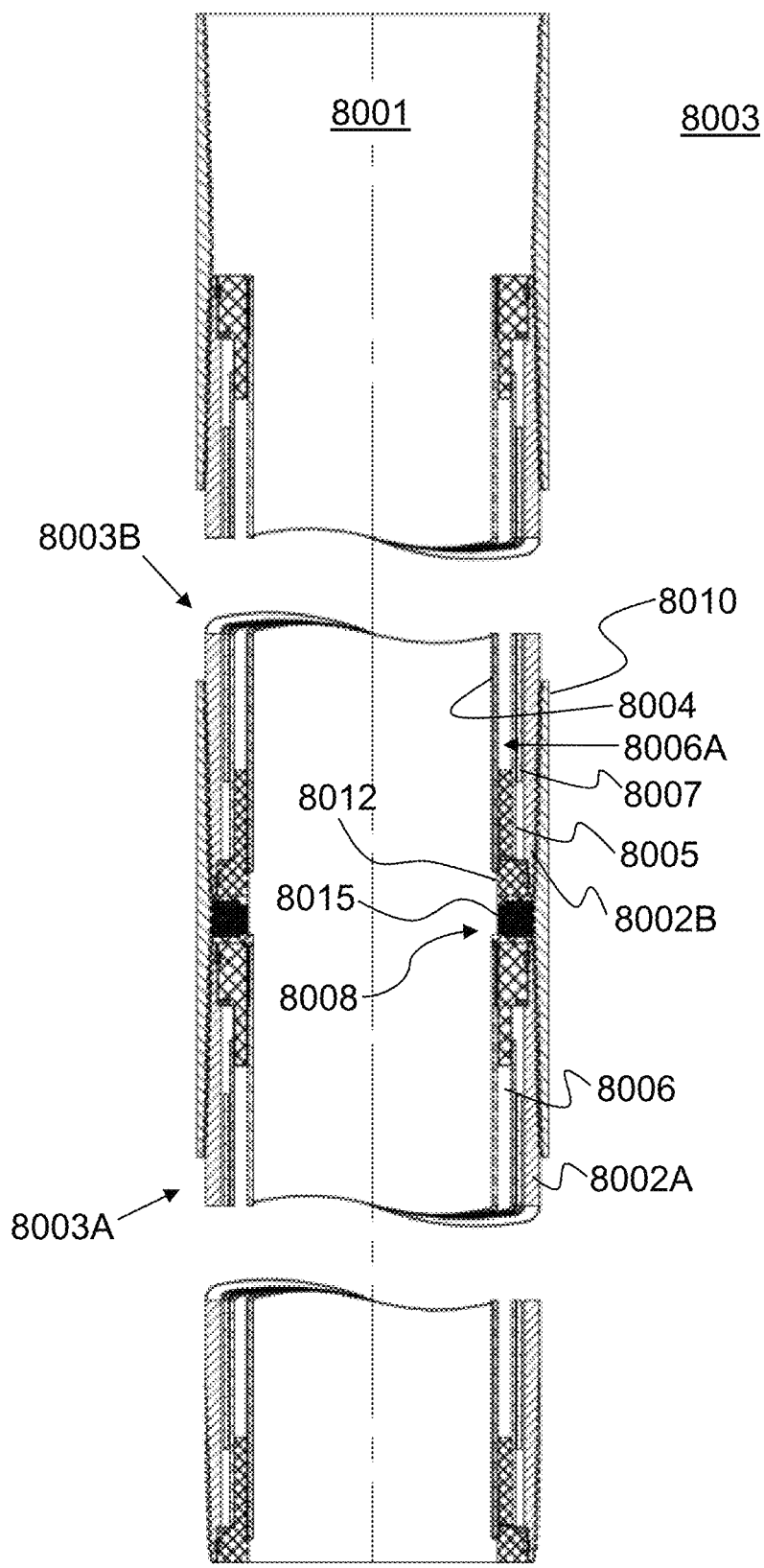
FIG. 21 is a side-elevation, mid-line cross-sectional view of another TIC, according to some embodiments of the present disclosure.

The TIC 8003 further comprises a second inner sleeve 8005 that is spaced from the inner sleeve 8004 to define the gap 8006A. Adjacent the second inner sleeve 8005 may be a layer of TIMs 8007. The second inner sleeve 8005 may be made of the same material as the inner sleeve 8004 or not. The layer of TIMs 8007 may be made of: polytetrafluoroethylene (PTFE), calcium silicate, cotton wool, cotton wool insulation, felt insulation, fiberglass, formed plastic, polystyrene, sheep wool, silica gel, Styrofoam, urethane foam, wool felt or any combination thereof FIG. 21 shows a first end 8003A of one TIC 8003 releasably coupled to a second end 8003B of another TIC 8003 via the connector 8010. As shown in the zoomed in view, the two TICs 8003 are releasably coupled in a fluid tight fashion due to the inter-conduit sealing member 8015 being compressed between the end face 8008B of the lower TIC 8003 and the end cap 8012 of the upper TIC 8003.

As will be appreciated by those skilled in the art, a difference between the TIC 8000 and the TIC 8003 is that TIC 8003 has the second inner sleeve 8005 and the layer of TIMs 8007. The result of this difference is that the TIC 8003 can reduce heat loss of high temperature static steam that is within the annular gap 8006A, as compared to the TIC 8000 or other TICs that do not have one or two inner sleeves. As such, high temperature and high pressure steam flow within the bore 8001 can access the gap 8006A that is defined between the inner sleeve 8004 and the second inner sleeve 8005. When the TIC 8003 is deployed in a steam assisted gravity drainage (SAGD) heavy oil production system, the fluid within the bore 8001 will be steam and that steam may access the gap 8006A to provide a measure of thermal insulation between the bore 8001 and outside of the TIC 8003. In the event that there is heat loss from the steam within the gap 8006A, that heat loss will cause the steam to condense into liquid water, which may then drain back into the bore 8001 where the steam located therein will re-heat the water back into steam.

Figure 22:
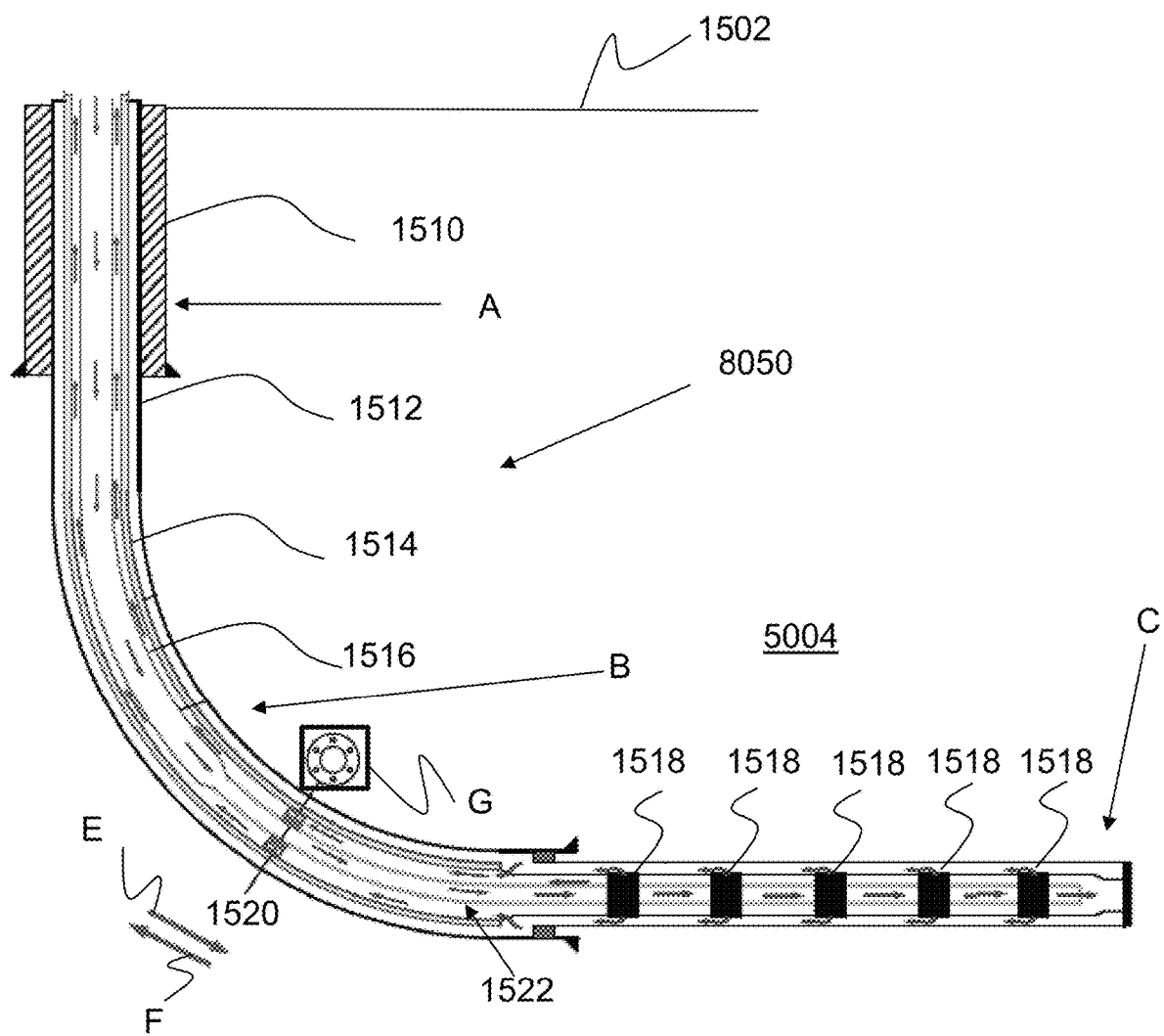
FIG. 22 is a side-elevation view of a well system during a steam circulation stage, according to some embodiments of the present disclosure.

FIG. 22 shows one example of a SAGD heavy oil production system where a well 8050 extends from the surface 1502 to an underground location 5004, where the location 5004 comprises one or more deposits of heavy oil entrapped within the surrounding geologic formation. The well 8050 may have three sections, a first section A that is substantially vertical, a second section B where the well deviates from being substantially vertical to substantially non-vertical, which may include being substantially horizontal. The third section C is substantially non-vertical that extends proximal to or through the location 5004. For clarity, the second section B may also be referred to as the heel of the well 8050 and the end of the third section that is furthest from the surface 1502 may be referred to as the toe of the well 8050.

Within the first section A, the well 8050 may comprise surface casing 1510 that extend downwards from the surface 1502. The surface casing may have an inner diameter of about 13 and ⅝ of an inch. Within the surface casing 1510, the well may further comprise a section of intermediate casing 1512 that has an inner diameter of about 9 and ⅝ of an inch. The intermediate casing 1512 may extend from the surface 1502 to a portion of the third section C. Within the intermediate casing 1512 the well may further comprise a string of TICs 1514. In some embodiments of the present disclosure, the string of TICs 1514 comprises some, mostly or substantially all TIC 8003, as described herein below. Within the string of TICs 1514, the well 8050 may further comprise a tubing string 1516 that extends from the surface 1502 to the second section B.

In some embodiments of the present disclosure, the well 8050 may further comprise one or more flow control devices 1518 that are deployed within the third section C. The flow control devices 1518 are known in the art and are configured to regulate the flow of steam out of the third section C in an effort to provide a more balanced distribution of steam outwardly from the third section C into the location 5004.

In some embodiments of the present disclosure, the well 8050 may further comprise a two-way flow control device 1520 that is deployed within the second section B of the well 8050. The device 1520 may comprise a plurality of apertures that are radially spaced about a central bore. The device 1520 may be positioned within the well 8050 so that the central bore of the device 1520 is in fluid communication with the bore of the tubing string 1516. The plurality of apertures are oriented to be in fluid communication with an annular space 1522 that is defined between the tubing string 1516 and the string of TICs 1514. The plurality of apertures may each further comprise a one-way flow valve so as to facilitate the flow of steam within the annular space 1522, as described further below.

In some embodiments of the present disclosure, the well 8050 can be utilized for two stages of a SAGD operation. For example, the well 8050 may be used to introduce steam from the surface 1502 towards the third section C. The steam may be introduced into the well 8050 by the tubing string 1516 and then travel downhole and then exit the tubing string 1516 proximal the toe. The steam will then flow upwardly, away from toe within the annular space 1522. The check-valves within the device 1522 permit the uphole flow of steam and prevent a downhole flow of steam within the annular space. At the surface 1502, the steam from the annular space 1522 is captured, potentially re-heated and/or pressurized and then introduced back into the well 8050 via the tubing string 1516. This stage of the SAGD operation may be referred to as steam circulation with the purpose of warming up the location 5004.

Figure 23:
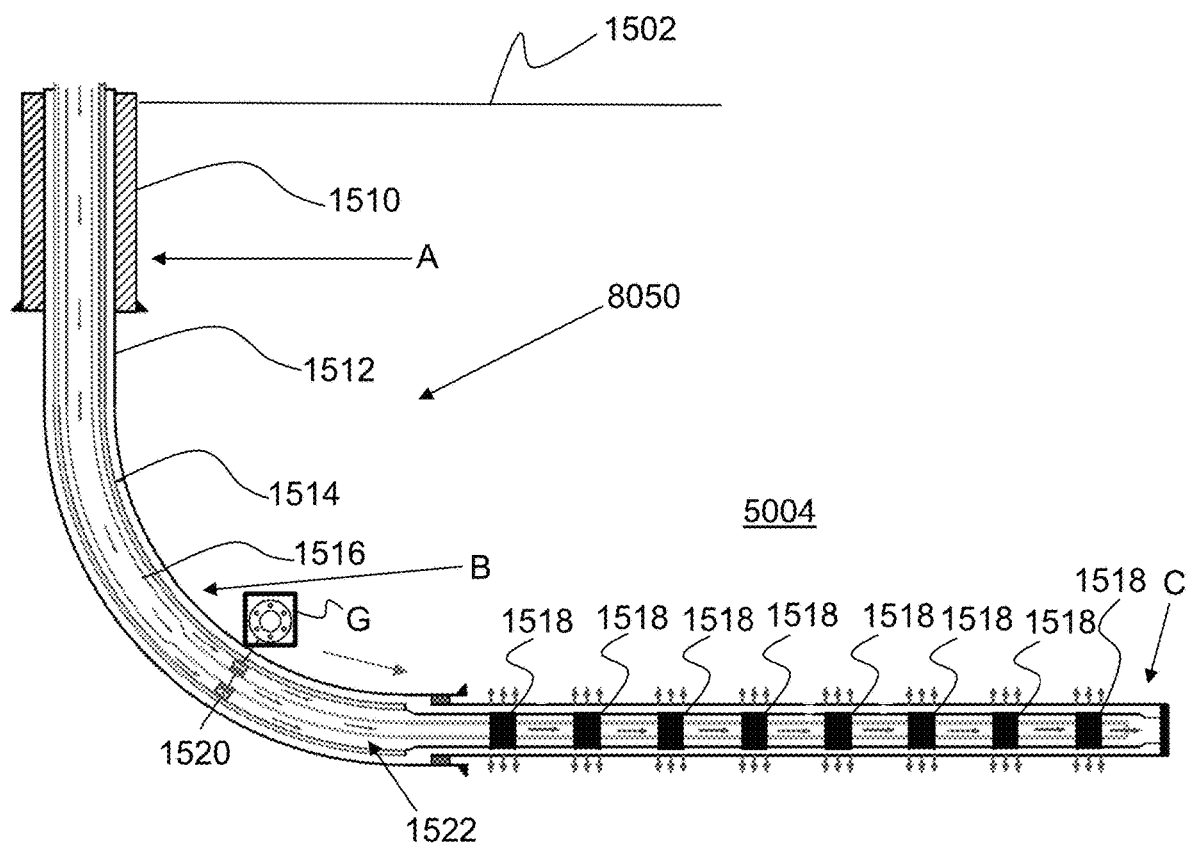
FIG. 23 is a side-elevation view of a well system during a steam injection stage, according to some embodiments of the present disclosure.

When the location 5004 is sufficiently warmed, then steam may be injected into the location 5004 via actuating the one or more flow control devices 1518, which provide fluid communication between the bore of the tubing string 1516 and the location 5004 (as shown in FIG. 23).

As will be appreciate by those skilled in the art, the various arrangements whereby a described sealing assembly provides a fluid tight seal, it is understood that the sealing assembly may be positioned on either of the abutting surfaces and not just the surface described herein.

As will be appreciated by those skilled in the art, the various embodiments of the TIC described herein may further include various connectors and/or sealing elements in order to ensure that the internal-fluid path is defined by a suitably connected string of conduits with the appropriate fluid-tight seals so as to avoid fluid communication between the internal-fluid path and outside the string of conduits.

As the person skilled in the art will also appreciate, while various non-limiting examples are described herein, there are various uses of the TIC described herein. For example, a string of TIC, as described herein, may be used for shallow or above-surface pipeline conduction of fluids in regions where the ambient temperatures can go below the freezing point of water.

As the person skilled in the art will also appreciate, while various non-limiting examples are described herein, the present disclosure contemplates other features of the systems described herein such as pumps that may be used to pressurize one or more fluids for being conducted through a string of TICs, as described herein. The systems described herein also contemplate the use of storage tanks and further conduits for achieving the practical goal of each system. For example, while not described herein in detail, it is understood that system 4000 has the required equipment and infrastructure in order to generate the steam 1506 of the desired temperature and pressure. Additionally, while not described herein in detail, it is understood that the system 7000 further comprises the equipment and infrastructure required to process the produced fluids 7001 conducted to the surface 1502.

Figure 24:
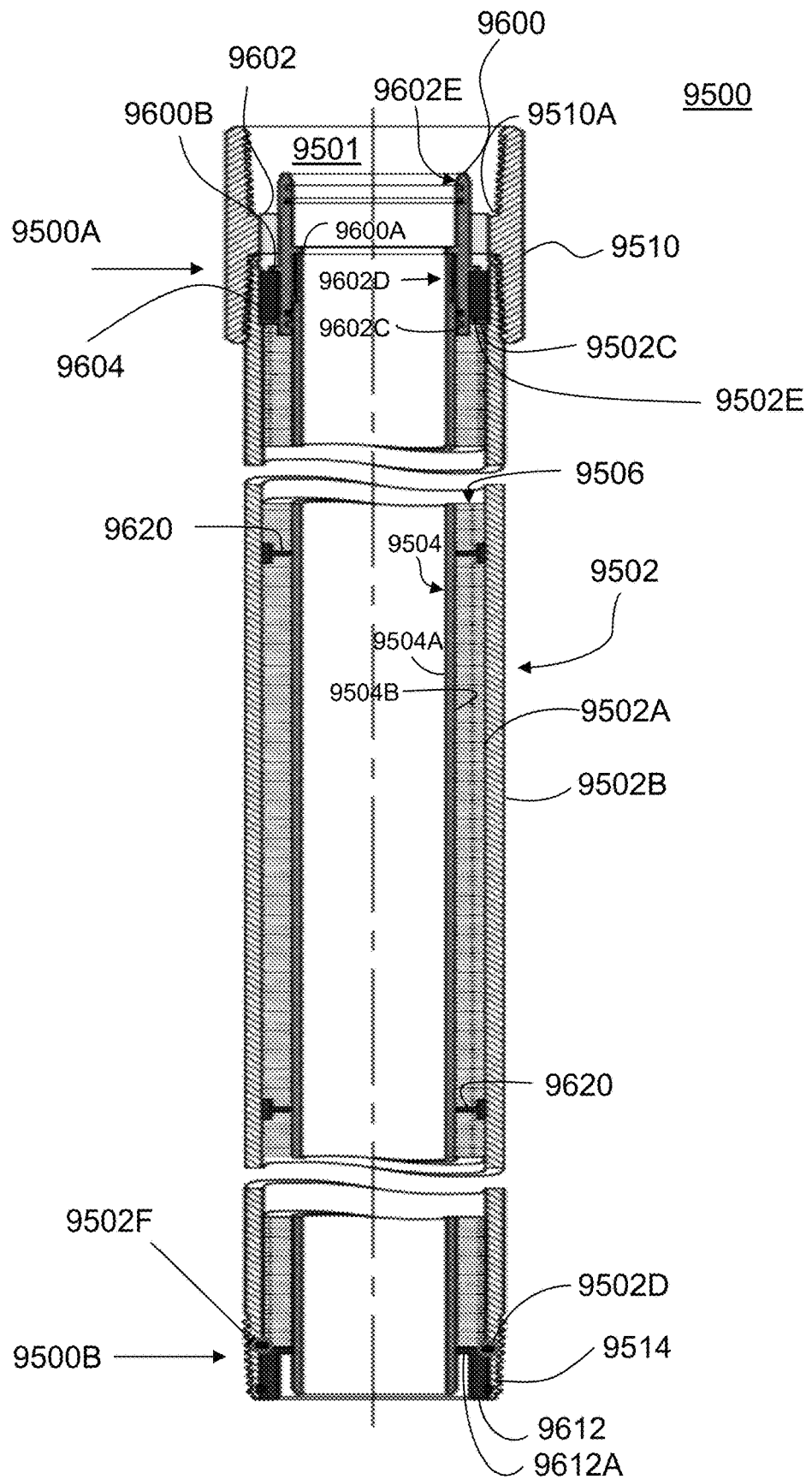
FIG. 24 is a side-elevation, mid-line cross-sectional view of another TIC, according to some embodiments of the present disclosure.

FIG. 24 shows another embodiment of a thermally-insulated conduit, namely TIC 9500. The TIC 9500 has many similarities to the other TICs described herein. At least some differences between the TIC 9500 and the other TICs described herein are the TIC 9500 comprises a first end cap 9600, a first spacer 9604 and a second spacer 9612, each described further below.

The TIC 9500 defines a first end 9500A and a second opposite end 9500B for defining a central bore 9501 and a longitudinal axis therebetween. The TIC 9500 further includes an outer metal conduit 9502, a first layer of TIM 9506, and an inner sleeve 9504. The metal conduit 9502 may be the same as the metal conduit feature described in relation to other TICs described herein with an inner surface 9502A and an outer surface 9502B. The first layer of TIM 9506 is positioned between the inner surface 9502A of the outer metal conduit 9502 and the inner sleeve 9504. The first layer of TIM 9506 provides thermal insulation to prevent a transfer of thermal energy between the central bore 9501 and the environment outside of the outer surface 9502B. The first layer of Tim 9506 may comprise: polytetrafluoroethylene (PTFE), aerogel, calcium silicate, cotton wool, cotton wool insulation, felt insulation, fiberglass, formed plastic, polystyrene, sheep wool, silica gel, Styrofoam, urethane foam, wool felt or any combination thereof. The inner sleeve 9504 comprises an inner surface 9504A that defines part of the central bore 9501 and an outer surface 9504B, which is adjacent to or abuts the first layer of TIM 9506 may be positioned interior to the first layer of TIM 9506. The inner sleeve 9504 is made of a rigid material that may or may have thermal conducting properties, such as steel and stainless steel, or a rigid material that has thermal insulator properties.

As shown in FIG. 24, the inner sleeve 9504 is at least partially supported at one end, proximal the first end 9500A of the TIC 9500 by the end cap 9600. The end cap 9600 can be made of a rigid material that has thermal conducting properties, such as steel and stainless steel, or a rigid material that has thermal insulator properties. The end cap 9600 is dimensioned to fit within the central bore 9501 and fit with the outer surface 9504B of the inner sleeve 9504. The end cap 9600 defines a first shoulder 9600A and a second shoulder 9600B. The first shoulder 9600A extends towards the central bore 9501 and the second shoulder 9600B extends away from the central bore 9501. The end cap 9600 also defines a connection region 9602D that is proximal the first shoulder 9600A and the connection region 9602D is configured to releasable connect with the outer surface of the inner sleeve 9504. For example, one end of the outer surface of the inner sleeve 9504 may define one half of a threaded connection that can mate with and connect to the connection regions 9602D and when so connected, the one end of the inner sleeve 9504 abuts the first shoulder 9600A.

The end cap 9600 may also define one or more glands 9602C that are configured to house and retain sealing members therein for establishing a fluid tight seal between the outer surface of the inner sleeve 9504 and the end cap 9600.

The end cap 9600 may also define one or more further glands 9602E that are configured to house and retain sealing members therein for establishing a fluid tight seal between the inner surface of the end cap 9600 and a second end of a second TIC 9500', as discussed further below.

The outer conduit 9502 may also define an inward shoulder 9502C that supports an inwardly extending support ring 9502E. The first spacer 9604 is positionable between the supporting ring 9502E and the second shoulder 9600B. The first spacer 9604 can be made of a rigid material that has thermal insulator properties, for example a polymer or a composite material, such as an engineered thermoplastic composite reinforced with carbon fiber or other structural support material, that can withstand temperatures of 300° C., or higher, without substantially any deforming or degrading and that prevents or substantially reduces a transfer of thermal energy between the end cap 9600 and the outer conduit 9502. The first spacer 9604 has sufficient mechanical properties at 300° C. so as to contribute towards bearing at least some, most or all of the weight and the flow dynamics of each joint of the inner sleeve 9504 upon the support ring 9502E.

In some embodiments of the present disclosure, the third spacer 9602 is positionable to be supported, at least partially upon the second shoulder 9600B so that a portion of the third spacer 9602 abuts a portion of the first spacer 9604. The third spacer 9602 need not have similar or the same mechanical properties at high temperatures as the first spacer 9604, as it does not contribute towards bearing the weight of the inner sleeve 9504. However, the third spacer 9602 does have the mechanical strength properties to retain the endcap 9600 in the desired position relative to the inner surface 9502A. In some embodiments of the present disclosure, the third spacer 9602 is made of a material that has thermal insulator properties, such as: polytetrafluoroethylene (PTFE), fiberglass, formed plastic, polystyrene, or any combination thereof.

In some embodiments of the present disclosure, the support ring 9502E extends a limited distance from the inner surface 9502A above the inward shoulder 9502C so as to define a gap 9503 (identified in FIG. 25) between the outer surface of the end cap 9600 and the outer conduit 9500. Without being bound by any particular theory, the gap 9503 provides a physical spacing between the end cap 9600 and the outer conduit 9502 so that when the end cap 9600 and the outer conduit 9502 are each made of a material with thermal conduction properties, the gap 9503 and the first spacer 9604 reduce, substantial prevent or completely prevent the transfer of thermal energy between the central conduit 9501 and outside the outer surface 9502B.

The second end 9500B of the TIC 9500 comprises a second spacer 9612. The third spacer 9602 is positionable between another support ring 9502F set on another inward shoulder 9502D defined by the inner surface 9502A of the outer conduit 9502 and the outer surface 9504B of the inner sleeve 9504. The second spacer 9612 may define a shoulder 9612A that extends inwardly to abut the outer surface 9504B and to provide an upper surface upon which the first layer of TIM 9605 may be at least partially supported. In some embodiments of the present disclosure, the second spacer 9612 may be made of the same or similar materials as the first spacer 9604 such that the second spacer 9612 has the same or similar physical properties and thermal insulator properties as the first spacer 9604. The second spacer 9612 also defines a groove for housing a portion of a retainer ring 9514 that is also at least partially supported by a groove defined at the inner surface 9502A at second end 9500B.

In some embodiments of the present disclosure, the TIC 9500 may further comprises one or more support rings 9620 that support the space between the outer surface 9504B of the inner sleeve 9504 and the inner surface 9502A of the outer conduit 9502 so that the integrity of the first layer of TIM 9506 is maintained.

Figure 25:
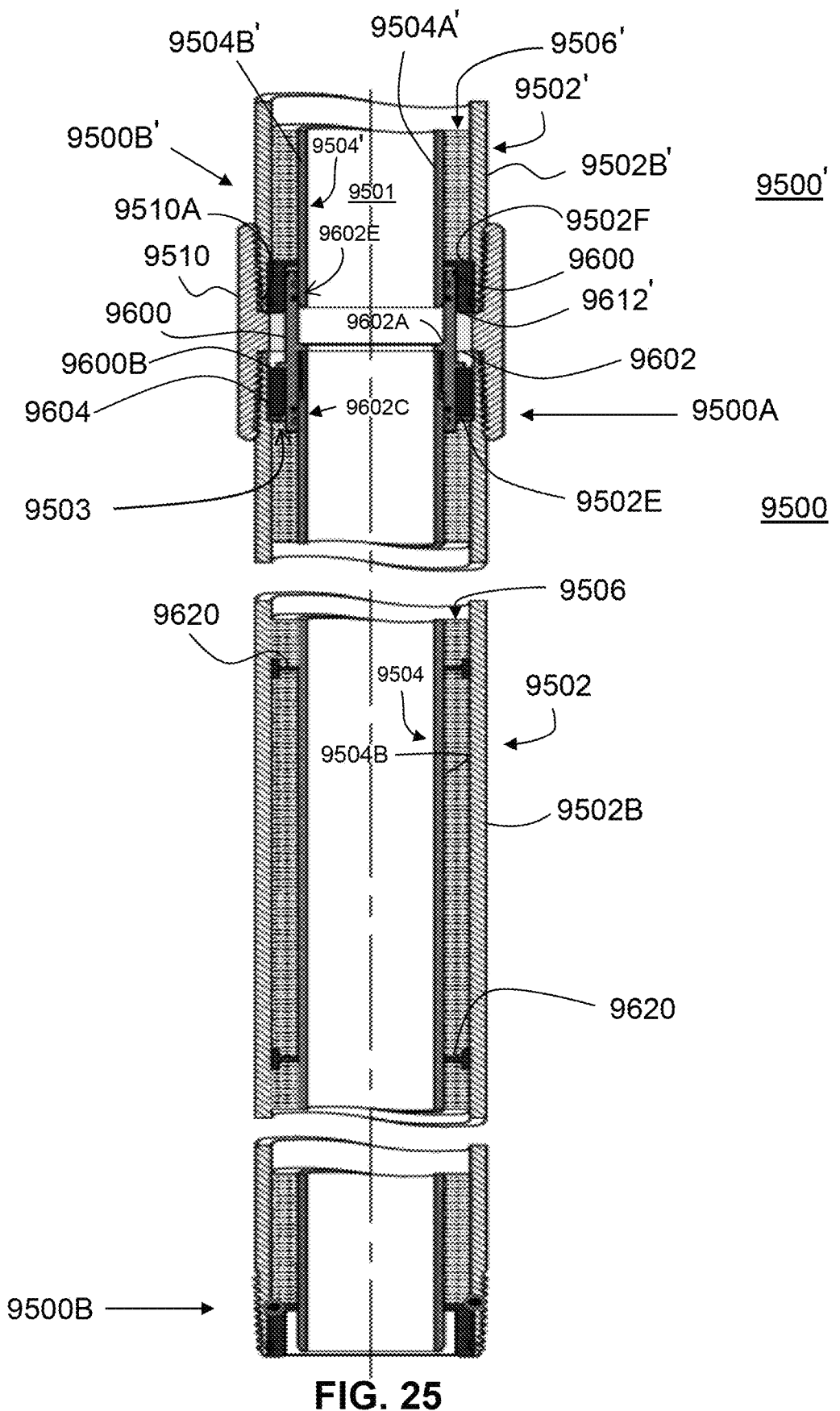
FIG. 25 is a side-elevation, mid-line cross-sectional view of the TIC of FIG. 24 coupled to another TIC, according to some embodiments of the present disclosure.

FIG. 25 shows a first end 9500A of one TIC 9500 releasably coupled to a second end 9500B' of a second TIC 9500' via the coupler 9510. The two TICs 9500 and 9500' are releasably coupled in a fluid tight fashion. Based upon the arrangements described herein and implementing the embodiments of the present disclosure, an API 5CT standard-made coupler 9510 with an inner tapered threading and both inner shoulders 9510A provide a fluid tight seal with an outer taper threading of the API 5CT standard-made outer conduit's first end 9500A's and its end face of one TIC 9500, and provide a fluid tight seal with API 5CT standard-made outer taper threading of the outer conduit's second end 9500B and its end face of a second TIC 9500'. The whole outer tubular 9502 and the coupler 9510 form a fluid-tight conduit for various wellbore applications. This is the most common API 5CT standard tubular application, so is considered a reliable downhole tubular technology.

When the outer metal conduit 9502' of the second TIC 9500' is coupled with the connector 9510 and the first TIC 9500, the outer surface 9504B' of inner sleeve 9504' from the second TIC 9500' slides into the first end cap 9600's an inner surface of the first TIC 9500. The inter-conduit sealing member 9602E is compressed between an inner face of the end cap 9600 of the lower TIC 9500 and the outer face 9504B' of the inner sleeve 9504' in the upper TIC 9500'. Without being bound by any particular theory, when coupled together, the sealing members 9602C within the end cap 9600 seal with the outer face 9504B of the inner sleeve 9504 of the lower TIC 9500. Also, the sealing members 9602E within the end cap 9600 seal with the outer face 9504B' of the inner sleeve 9504' of the upper TIC 9500'. Therefore, the end cap 9600 with its seals in place connect both adjacent inner sleeves together and form a fluid tight inner conduit so that no or little fluid leaves or enters the bore 9501 across the inner conduit. In some embodiments of the present disclosure, both an outer API metal conduit and an inner steel conduit can be used to form an independent fluid tight tubular with the connector 9510 and seals described herein. Furthermore, the fluid tight seal also provides thermal insulation between the central bore 9501 and outside the outer surface 9502B of the outer conduit 9502. The first layer of TIM 9506, the third spacer 9602, the first spacer 9604 and the second spacer 9612' provide an effective thermal barrier (i.e. thermal insulation that prevents some, most or substantially all conduction of thermal energy) and this arrangement also provides a substantially complete fluid barrier (i.e. little to substantially no fluid movement) at the point where the two TICs 9500, 9500' are coupled together.

Figure 26:
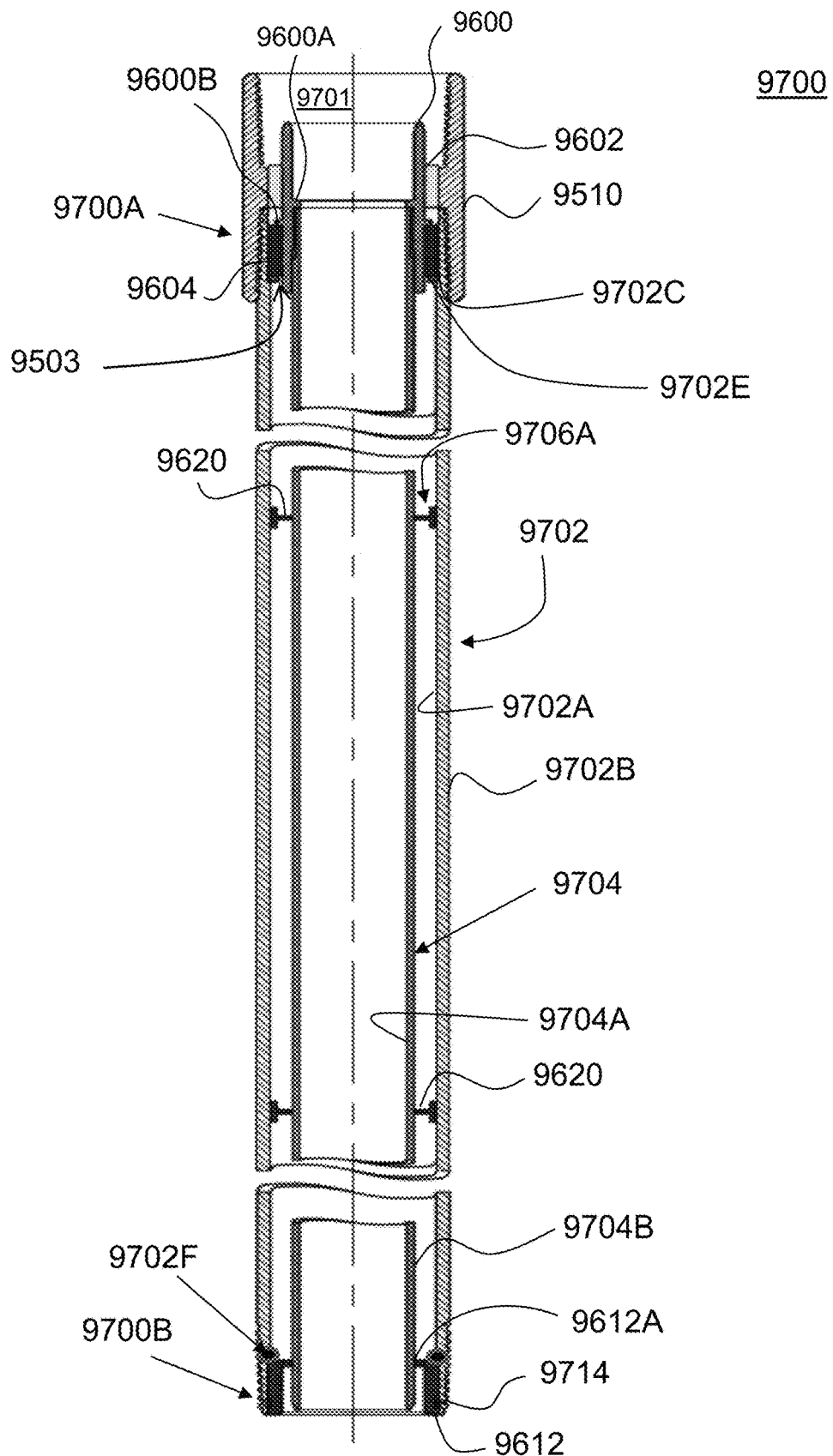
FIG. 26 is a side-elevation, mid-line cross-sectional view of another TIC, according to some embodiments of the present disclosure.
Figure 27:
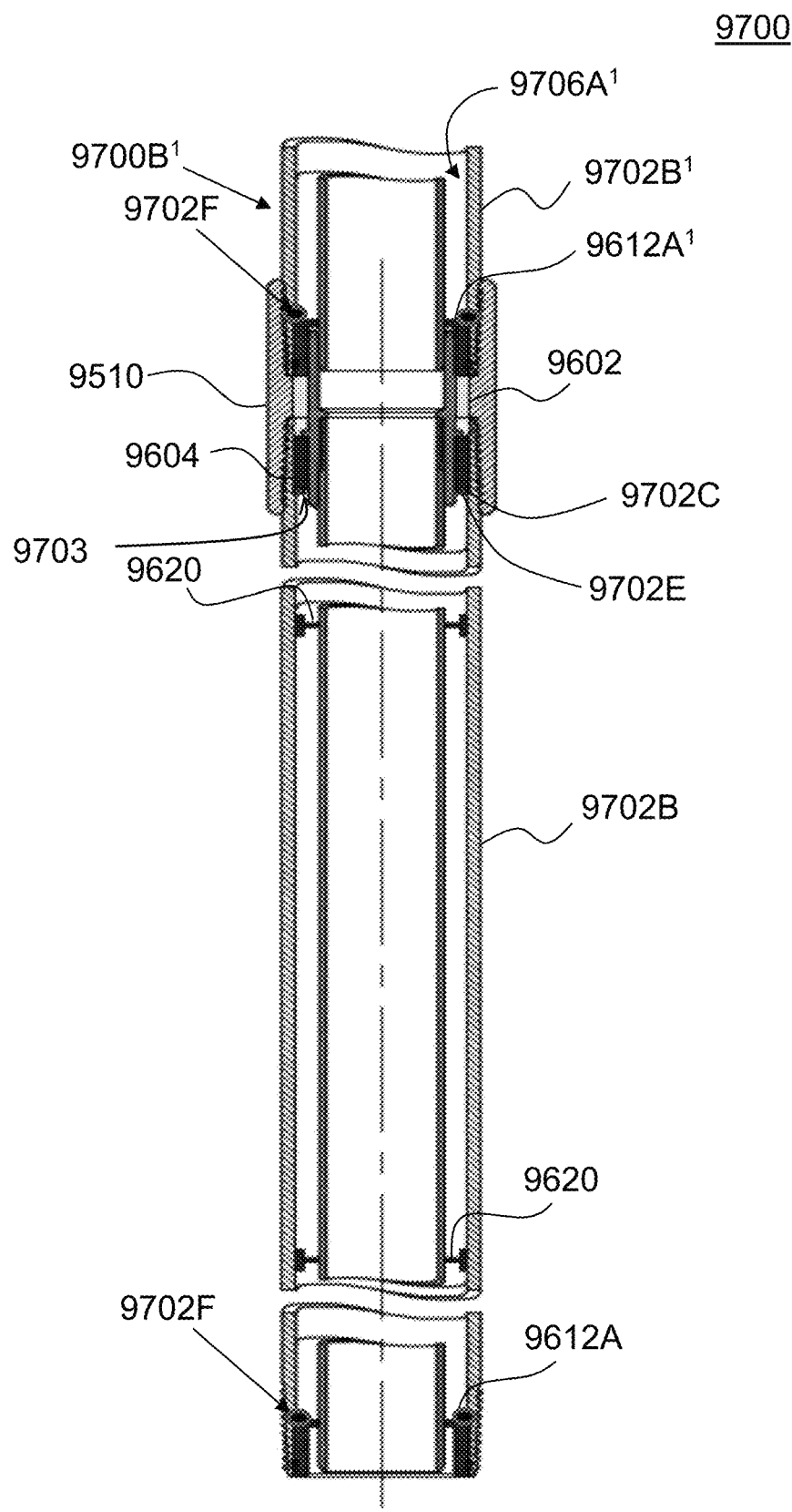
FIG. 27 is a side-elevation, mid-line cross-sectional view of the TIC of FIG. 26 coupled to another TIC, according to some embodiments of the present disclosure.

FIG. 26 shows a further thermally insulated conduit (TIC) 9700. The TIC 9700 has many of the same features as the TIC 9500 with at least the differences of: TIC 9700 does not have a first layer of TIM nor does TIC 9700 have sealing members to provide a fluid tight seal at the connection point between the TIC 9700 and a second TIC 9700' (as shown in FIG. 27).

TIC 9700 comprises a first end 9700A and a second end 9700B for defining a central bore 9701 therebetween and a longitudinal axis of the TIC 9700. The TIC 9700 also comprises an outer conduit 9702 that has an inner surface 9702A and an outer surface 9702B. The TIC 9700 has an inner sleeve 9704 that has an inner surface 9704A, which defines a portion of the central bore 9701, and an outer surface 9704B. Similar or the same as described above in regards to TIC 9500, the TIC 9700 also comprises the end cap 9600, which defines the first shoulder 9600A and the second shoulder 9600B. The TIC 9700 also comprises a shoulder 9702C with an inwardly extending supporting ring 9702E, which functions in a similar or the same fashion as the supporting ring 9502E described above. The TIC 9700 also comprises the third spacer 9602, the first spacer 9604 and the second spacer 9612. The first spacer 9604 is supported between the support ring 9702E and the second shoulder 9600B and the third spacer 9602 is at least supported by the second shoulder 9600B.

As described above, the TIC 9700 does not include the sealing members of TIC 9500 and nor does TIC 9700 include a first layer of TIM. As such, when the TIC 9700 is coupled to a second TIC 9700' (as shown in FIG. 27), and then deployed downhole, downhole fluid (such as liquid water, steam or the like) may enter the gap between the outer surface 9704B and the inner surface 9702A at either or both of the first end 9700A and the second send 9700B. In these embodiments, the downhole fluid may act as a thermal insulator between the inner sleeve 9704 and the outer conduit 9702.

Without being bound by any particular theory, the third spacer 9602, the first spacer 9604 and the second spacer 9612' provide a barrier to conduction of thermal energy at the point where the two TICs 9700, 9700' are coupled together.

Figure 28:
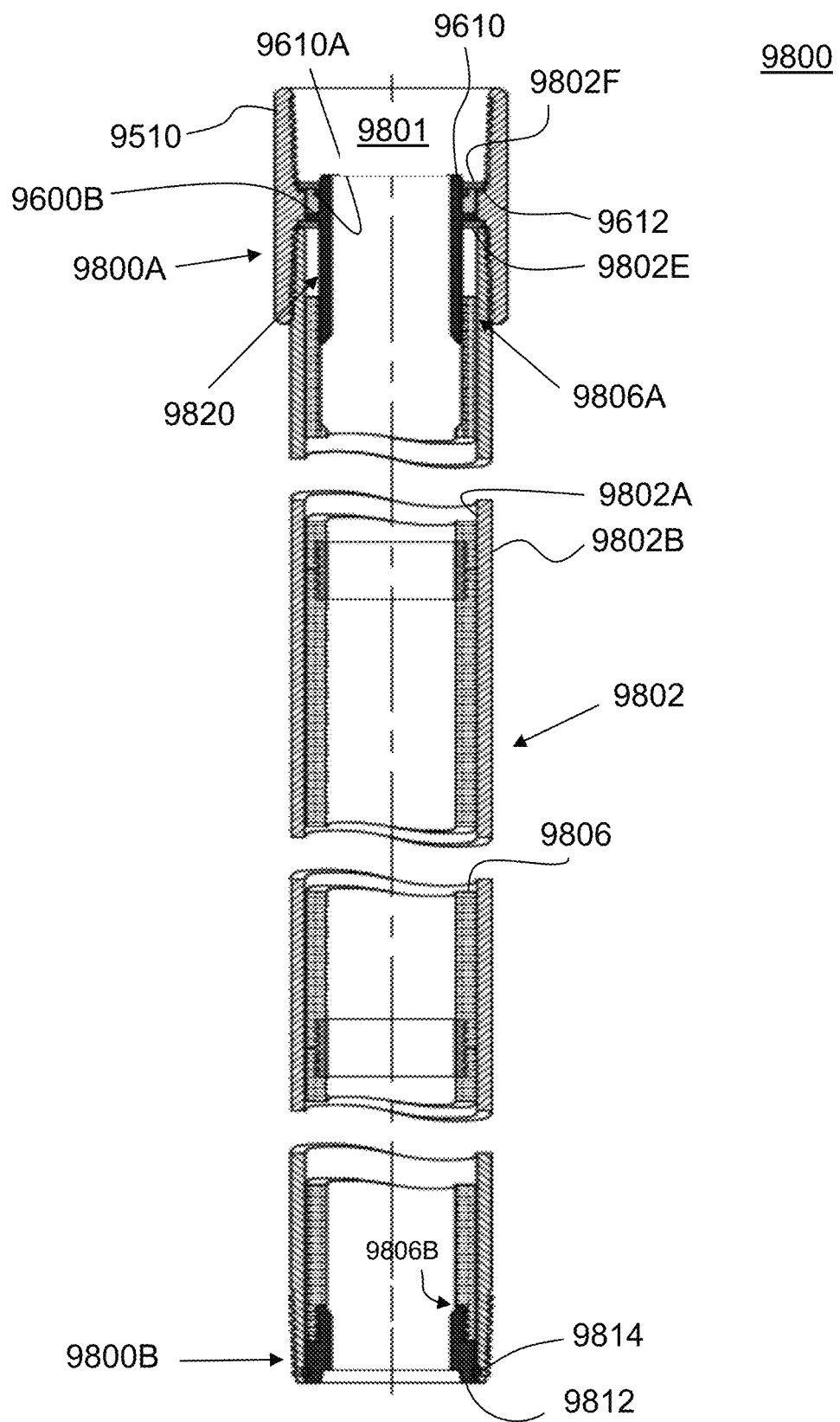
FIG. 28 is a side-elevation, mid-line cross-sectional view of another TIC, according to some embodiments of the present disclosure.

FIG. 28 shows a further thermally insulated conduit (TIC) 9800. The TIC 9800 has many of the same features as the TIC 9500 with at least the differences of: TIC 9800 does not have an inner sleeve, nor does TIC 9800 have sealing members to provide a fluid tight seal at the connection point between the TIC 9800 and a second TIC 9800' (as shown in FIG. 29).

TIC 9800 comprises a first end 9800A and a second end 9800B for defining a central bore 9801 therebetween and a longitudinal axis of the TIC 9800. The TIC 9800 also comprises an outer conduit 9802 that has an inner surface 9802A and an outer surface 9802B. The TIC 9800 has first layer of TIM 9806 that is adjacent to or abuts the inner surface 9802A and the first layer of TIM 9806 defines a portion of the central bore 9801. The materials of the first layer of TIM 9806 may be as described herein above in regards to TIC 9500 and other TICs. Similar or the same as described above in regards to TIC 9500, the TIC 9800 also comprises the end cap 9610, which defines the second shoulder 9600B but not the first shoulder 9600A. The TIC 9800 also defines a first inwardly extending supporting ring 9802E and a second inwardly extending supporting ring 9802F. The first supporting ring 9802E may be supported between the first end of the outer conduit 9802 and the connector 9510 and, in turn, the first supporting ring 9802E at least partially supports the second shoulder 9600B. The second supporting ring 9802F, which functions in a similar or the same fashion as the supporting ring 9502E described above. The TIC 9700 also comprises a first spacer 9603 and a second spacer 9812. The first spacer 9603 is at least partially supported between the second shoulder 9600B and the second supporting ring 9802F.

At the second end 9800B the TIC 9800 comprises a second spacer 9812 that is configured to be operatively connected to the inner surface 9802A of the outer conduit 9802 by a retainer ring 9814. The second spacer 9812 may be formed of similar or the same materials as the first spacer 9604 and it may be configured to couple to the second end of the first layer of TIMs 9806. For example, the second spacer may comprise an outwardly facing coupling region that is configured to releasably mate with an couple to the second end of the first layer of TIMs 9806, for example by way of a threaded connection. In some embodiments of the present disclosure, the second spacer 9812 has sufficient physical properties, in conjunction with the retainer ring 9814, to bear at least a portion of the weight of the first layer of TIMs 9806.

Figure 29:
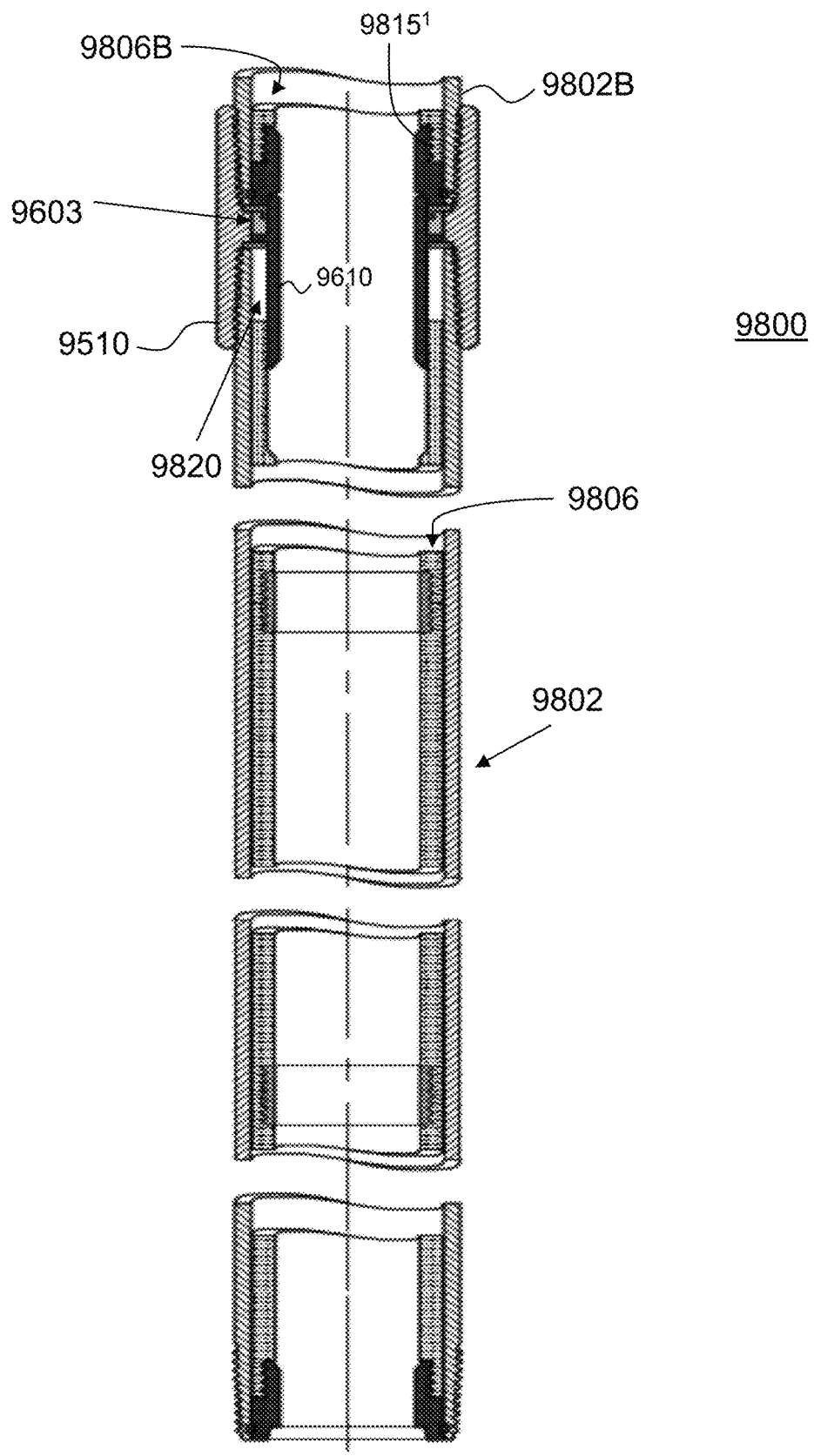
FIG. 29 is a side-elevation, mid-line cross-sectional view of the TIC of FIG. 28 coupled to another TIC, according to some embodiments of the present disclosure.

As shown in FIG. 29, the TIC 9800 can be operatively coupled to a second TIC 9800' by the connector 9510. When operatively coupled, the second spacer 9815' of the second TIC 9800' is at least partially supported by the second supporting ring 9802F and a first end of the end cap 9600.

EXAMPLES

Table 1 of a first example provides a series of sample calculations that model the annual greenhouse gas (GHG) reduction that could be realized employing the embodiments employing the embodiments of the present disclosure from a wellbore for transferring heat from a first location to a geothermal energy production facility, as depicted in the non-limiting example of FIG. 11. In the first sample calculations, the wellbore has a depth of about 1900 meters with a bottom hole temperature of about 80° C., the wellbore is cased with casing having an external diameter of about 140 mm (5.5 inches) and an internal diameter of about 125.74 mm. The TCI has an external diameter of about 73 mm, an internal diameter of about 41 mm providing about 200 m3/day of circulation flow from the first location (i.e. at the bottom of the wellbore) to the second location (i.e. to the geothermal production facility).

TABLE 1

A first series of sample calculations that model the annual greenhouse gas (GHG) reduction.

1990 m, 73.02 → 125.74 mm Annual Space, 41 mm Insul-Tubing ID, 200 m3/d water circulation

| (L/Min) | 138.89 | (Pa) | (Psi) | Water Pump Power Re'q (KW) | Pump System Re'q (KW) 50% Sys Efficiency | $p_B = p_A - \rho g \left( \Delta z + f \frac{L}{D} \frac{V^2}{2g} \right)$ |
|---|---|---|---|---|---|---|
| Pressure Friction | (Total) | 1453086 | 210.8 | 3.36 | 6.73 | |
| Fluid Volume Velocity (L/min) | 138.89 | 8.3334 | (200 m3/day) | (8.3334 m3/h) | | |
| (m3/sec) | 0.002315 | | | | | |
| Tubing and Annulus length (m) | 1900 | | Linear Velocity (m/s) Pressure Friction | | | |
| Casing ID (m) | 0.12574 | Area Cross-section (m2) | | | (pa) | (Psi) |
| Tubing OD, meter (m) | 0.07302 | Annulus 1800 m | 0.008229914 | 0.281 | 28512 | 4.14 Annulus Downward |
| Tubing ID, meter (m) | 0.041 | Tubing 1900 m | 0.001320257 | 1.753 | 1424574 | 206.6 Tubing Upward |
| p, Water density (kg/m3) | 1000 | | | 2.18 | | |
| f, Friction faction (from Curve) | 0.02 | | Hours to Complete One Circulation | | | |

TABLE 1-continued

A first series of sample calculations that model the annual greenhouse gas (GHG) reduction.

| | 5.500" Casing Well, 2.875" Producing Tubing, 1900 m deep, 80° C. Bttm Hole Temp | | | Surfacing Heat and Economic Benefit Generated Equivalent Electrical Power to Save | | | | Equivalent GHG Reduction https://oee.nrcan.gc.ca/ |
|---|---|---|---|---|---|---|---|---|
| | 200 Cubic Meter per day Water Circulation | | | | Water Pump | | Annual | https:// |
| Insulation Tubing Diimension | Insu K Value K-W/m.k) | Pump-down Water Temp ° C. | Returned Water Temp ° C. | Heat Energy Produced [kW] | Sys Power Consumption [KW] | Energy Saved [KW] | Economic Benefit [$0.07/KWH] | blueskymodel.org/ kilowatt-hour1.13lb/KWH |
| OD61 mm × ID41 mm × Wall 10 mm | k = 0.24 | 20 | 64 | 423 | 6.73 (200% Water Pump Power) | 416.09 | $251.651 | 1.844 Metric Tons of GHG to be saved annually |

These first sample calculations are based upon the following factors and assumptions, as shown in Table 2.

TABLE 2

Factors and assumptions of first sample calculations.

| | | [kWh/m³ K] | (m3/h) Water | 8.3333 1.16 | |
|---|---|---|---|---|---|
| L - Tubing Length m | 1900 | | This number will include ALL insulation Tubes | | |
| pai | 3.1416 | | | | |
| k - PTFE W/(m.K) | 0.24 | | PTFE or its Aerogel Composite | | |
| Cp - Hydraulic J/(kg.K) | 4190 | | Water | | |
| ri - Tubing inner radium | 41 | | | | |
| ro - Tubing outer radium | 61 | | (= ri + 2 * 10) | | |
| q - volumetric flow rate | 0.0023148 | (m3/second) | (Input 200 m3/day) | Fluid Volumetric Velocity | |
| Rou - Hydraulic Density kg/m³ | 1000 | Water | | | |
| pai × k × L (A) | 1432.57 | | | | |
| q × Cp × Rou × Ln(ro/ri) (B) | 3853.46 | | 0.397301797 Ln(ro/ri) | | |
| (B − A) | 2420.89 | | | | |
| (B + A) | 5286.03 | | | | |
| T0 | 323 | | (Casing Temp) | | |
| T1 | 353 | | (Inlet Temp) | | |
| T2 | 336.74 | 63.74 | (Output Temp C) | | |
| Degree C ------ ------> | | 63.74 | | | |

This expression for log mean area can be inserted into Equation 2-5, allowing us to calculate the heat transfer rate for cylindrical geometries $$\dot{Q} = kA_{lm}\left(\frac{\Delta T}{\Delta r}\right)$$

$$= k\left[2\pi L\left(\frac{r_o - r_i}{\ln\frac{r_o}{r_i}}\right)\right]\left(\frac{T_o - T_i}{r_o - r_i}\right)$$

$$\dot{Q} = \frac{2\pi k L(\Delta T)}{\ln(r_o/r_i)}$$

where:
L = length of pipe (ft)
$r_i$ = inside pipe radius (ft)
$r_o$ = outside pipe radius (ft)

$$p = q_v \times 1.16 \times \Delta T$$
With:

TABLE 2-continued

Factors and assumptions of first sample calculations.

p in [KW]
$q_v$ in [m³/h]
1.16: Volumetric heat of water in [kWh/m³ K]

T2 Output Temp (k)
T0 - Casing Average Temp
T1 Input Temp $$2 * \pi * k * L \frac{\left\{ T0 - \frac{1}{2} * (T1 + T2) \right\}}{\operatorname{Ln}\left(\frac{ro}{ri}\right)} = q * [Cp * \rho * (T2 - T1)]$$

$$2 * \pi * k * L * T0 - \pi * k * L * T1 - \pi * k * L * T2 =$$
$$q * Cp * \rho * T2 * \operatorname{Ln}\left(\frac{ro}{ri}\right) - q * Cp * \rho * T1 * \operatorname{Ln}\left(\frac{ro}{ri}\right)$$

$$A = \pi * k * L$$

$$B = q * Cp * \rho * \operatorname{Ln}\left(\frac{ro}{ri}\right) \quad \begin{array}{l} \ln e - 0.618 \\ \lg 10 \end{array}$$

$$T2 = \{2 * A * T0 + (B - A) * T1\} / (B + A)$$

Table 3 of a second example provides a series of sample calculations that model the annual GHG reduction that could be realized employing the embodiments of the present disclosure from a wellbore for transferring heat from a first location to a geothermal energy production facility, as depicted in the non-limiting example of FIG. 11. In the second sample calculations, the wellbore has a depth of about 3100 meters with a bottom hole temperature of about 105° C., the wellbore is cased with casing having an external diameter of about 178 mm (7 inches) and an internal diameter of about 160 mm. The TCI has an external diameter of about 100 mm, an internal diameter of about 55 mm providing about 300 m³/day of circulation flow from the first location (i.e. at the bottom of the wellbore) to the second location (i.e. to the geothermal production facility).

TABLE 3

A second series of sample calculations that model the annual greenhouse gas (GHG) reduction.

3100 m, 101.6 → 159.42 mm Annual Space, 55 mm Insul-Tubing ID, 300 m3/d

| | (L/min) 208.33 | (Pa) | (Psi) | Water Pump Power Re'q (KW) | System Re'q (KW) 50% Sys Efficiency | $p_B = p_A - \rho g \left( \Delta z + f \frac{L}{D} \frac{V^2}{2g} \right)$ | |
|---|---|---|---|---|---|---|---|
| Pressure Friction | (Total) | 1249881 | 181.3 | 4.34 | 8.68 | | |
| Fluid Volume Velocity (L/min) | 208.33 | 12.4998 | (300 m3/day) | (12.4998 m3/h) | | | |
| (m3/sec) | 0.003472 | | | | | | |
| Tubing and Annulus length (m) | 3100 | | Linear Velocity (m/s) Pressure Friction | | | | |
| Casing ID (m) | 0.15942 | Area Cross-section (m2) | | | (Pa) | (Psi) | |
| Tubing OD, meter (m) | 0.1016 | Annulus 3000 m: | 0.011853395 | 0.293 | 46006 | 6.67 | Annulus Downward |
| Tubing ID, meter (m) | 0.055 | Tubing 3100 m: | 0.002375835 | 1.461 | 1203875 | 174.61 | Tubing Upward |
| p, Water density (kg/m3) | 1000 | | | | 3.53 | | |
| f, Friction factor (from Curve) | 0.02 | | | Hours to Complete One Circulation | | | |

TABLE 3-continued

A second series of sample calculations that model the annual greenhouse gas (GHG) reduction.

| 7.000" Casing Well, 3.500" Producing Tubing, 3100m deep, 105° C. Bttm Hole Temp | | | | Surface Heat and Economic Benefit Generated Equivalent Electrical Power to Save | | | | Equivalent GHG Reduction https://oee.nrcan.gc.ca/ |
|---|---|---|---|---|---|---|---|---|
| 300 Cubic Meter per day Water Circulation | | | | Heat | Water Pump | | Annual | https:// |
| Insulation Tubing Dimension | Insu K Value K-W/m.k) | Pump-down Water Temp ° C. | Returned Water Temp ° C. | Energy Produced [KW] | Sys Power Consumption [KW] | Energy Saved [KW] | Economic Benefit $0.07/KWH] | blueskymodel.org/ kilowatt- hour1.13lb/KWH |
| OD75 mm × ID55 mm × Wall 10 mm | k = 0.24 | 20 | 76 | 812.00 | 8.68 (200% Water Pump Power) | 803.32 | $485,847.94 | 3560 Metric Tons of GHG to be saved annually |

These second sample calculations are based upon the following factors and assumptions, as shown in Table 4.

TABLE 4

Factors and assumptions of second sample calculations.

|  |  | [kWh/m3 K] | (m3/h) Water | 12.5000 1.16 |
|---|---|---|---|---|
| L -Tubing Length m | 3100 | | This number will include ALL insulation Tubings | |
| pai | 3.1416 | | | |
| k - PTFE W/(m.K) | 0.24 | | PTFE or its Aerogel Composite | |
| Cp - Hydraulic J/(kg.K) | 4190 | | Water | |
| ri - Tubing inner radium | 55 | | | |
| ro - Tubing outer radium | 75 | | (= ri + 2 * 10) | |
| q - volumetric flow rate | 0.003472222 | (m3/ second) | (Input 300 m3/day) | Fluid Volumetric Velocity |
| Rou - Hydraulic Density kg/m³ | 1000 | Water | | |
| pai × k × L (A) | 2337.4 | | | |
| q × Cp × Rou × Ln(ro/ri) (B) | 4512.3 | | 0.397301797 Ln(ro/ri) | |
| (B − A) | 2175.0 | | | |
| (B + A) | 6849.7 | | | |
| T0 | 335.5 | | (Casing Temp) | |
| T1 | 378 | | (Inlet Temp) | |
| T2 | 349.00 | | Output Temp | |
| Degree C -- ----------> | | 76.00 | | |

This expression for log mean area can be inserted into Equation 2-5, allowing us to calculate the heat transfer rate for cylindrical geometries $$\dot{Q} = kA_{lm}\left(\frac{\Delta T}{\Delta r}\right)$$

$$= k\left[2\pi L\left(\frac{r_o - r_i}{\ln\frac{r_o}{r_i}}\right)\right]\left(\frac{T_o - T_i}{r_o - r_i}\right)$$

$$\dot{Q} = \frac{2\pi k L(\Delta T)}{\ln(r_o/r_i)}$$

TABLE 4-continued

Factors and assumptions of second sample calculations.

where:
L = length of pipe (ft)
$r_i$ = inside pipe radius (ft)
$r_o$ = outside pipe radius (ft)

$p = q_v \times 1.16 \times \Delta T$
With:
p in [KW]
$q_v$ in [m³/h]
1.16: Volumetric heat of water in [kWh/m³ K]
ΔT: Temperature difference gained or lost by water in [° C.] (or [K])

T2 Output Temp (k)
T0 - Casing Average Temp
T1 Input Temp $$2 * \pi * k * L \frac{\left\{T0 - \frac{1}{2} * (T1 + T2)\right\}}{\text{Ln}\left(\frac{ro}{ri}\right)} = q * [Cp * \rho * (T2 - T1)]$$

$$2 * \pi * k * L * T0 - \pi * k * L * T1 - \pi * k * L * T2 =$$
$$q * Cp * \rho * T2 * \text{Ln}\left(\frac{ro}{ri}\right) - q * Cp * \rho * T1 * \text{Ln}\left(\frac{ro}{ri}\right)$$

$A = \pi * k * L$ $B = q * Cp * \rho * \text{Ln}\left(\frac{ro}{ri}\right) \quad \begin{array}{l} \ln e - 0.618 \\ \lg 10 \end{array}$ $T2 = \{2 * A * T0 + (B - A) * T1\} / (B - A)$ Without being bound to any particular theory, the first sample calculations indicate a potential annual GHG savings of about 1844 metric tons of GHG for a single deployment, as described. Without being bound to any particular theory, the second sample calculations indicate a potential annual GHG savings of about 3560 metric tons of GHG for a single deployment, as described.

We claim:

1. A thermally insulated conduit (TIC) comprising:
an outer conduit that defines a first end, a second end and a central bore that extends therebetween;
a first support that is operatively connected proximal the first end of the outer conduit, the first support extends inwardly through the central bore away from the outer conduit;
a first spacer that is supported by the first support;
a second spacer that is positionable proximal the second end of the outer conduit within the central bore the second spacer is at least partially supported by a support ring that engages the outer conduit and
an end cap that is positionable within the central bore, the end cap defining a shoulder that extends through the central bore towards the outer conduit;
wherein the first spacer is positionable between the first support and the shoulder of the end cap, and
wherein the TIC defines a gap between the first support and the end cap.

2. The TIC of claim 1, further comprising a first layer of a thermally insulating material (TIM) that is positionable within the central bore adjacent an inner surface of the outer conduit, the layer of TIM is at least partially supported by the end cap and the first support at a first end of the layer of TIM and by the second spacer at a second end of the layer of TIM.

3. The TIC of claim 2, further comprising a third spacer, wherein the first spacer comprises a TIM, the second spacer comprises a TIM, and the third spacer comprises a TIM.

4. The TIC of claim 1, further comprising a coupler that is configured to operatively couple to the first end of the outer conduit and to a second end of a second TIC.

5. The TIC of claim 4, further comprising a sealing member that is positionable within the central bore, within the coupler, adjacent an outer surface of the end cap and at least partially supported by the shoulder of the end cap.

6. The TIC of claim 5, wherein the sealing member comprises a TIM.

7. The TIC of claim 1, further comprising an inner conduit that is positionable within the central bore, coaxial with the outer conduit and spaced therefrom, wherein the inner conduit is configured to be operatively coupled to an inner surface of the end cap.

8. The TIC of claim 7, wherein the end cap is threadably connectible with a first end of the inner conduit and the end cap is configured to be in a slidable and overlapping arrangement with a second end of an inner conduit from a second TIC.

9. The TIC of claim 7, wherein a second end of an inner conduit from a second TIC is thermally expandable into the end cap and the TIC inner conduit length is also thermally expandable if a temperature within the inner conduit is greater than a temperature outside the outer conduit.

10. The TIC of claim 7, wherein the end cap is positionable to abut between an inner surface of the first end of the outer conduit and an outer surface of a first end of the inner conduit, wherein the end cap is configured to provide a fluid tight seal between the inner surface of the end cap and an outer surface of the inner conduit.

11. The TIC of claim 7, further comprising a support ring that is positioned between the outer conduit and an outer surface of the inner conduit.

12. An assembly of two thermally insulated conduits (TICs), the assembly comprising
a first TIC comprising:
an outer conduit that defines a first end, a second end and a central bore that extends therebetween;
a first support that is operatively connected proximal the first end of the outer conduit, the first support extends inwardly through the central bore from the outer conduit;
a first spacer that is supported by the first support;
a second spacer that is positionable proximal the second end of the outer conduit within the central bore the second spacer is at least partially supported by a support ring that engages the outer conduit;
an end cap that is positionable within the central bore, the end cap defining an shoulder that extends towards the outer conduit, wherein the first spacer is positionable between the first support and the shoulder of the end cap, and
wherein the TIC defines a gap between the first support and the end cap,
a second TIC operatively coupled to the first end of the first TIC, the second TIC comprising:
a spacer that is positionable proximal the second end of the outer conduit within the central bore, the spacer is at least partially supported by a support ring that engages the outer conduit, and
a coupler operatively connecting the first end of the first TIC to the second end of the second TIC extending the central bore of the first TIC through the second TIC to form a substantially complete seal to prevent fluid communication from the central bore across the coupler, the first TIC and the second TIC, wherein the assembly prevents substantially all conduction of thermal energy from the central bore to across the coupler, the first TIC and the second TIC.

* * * * *